United States Patent
Ohbitsu

(10) Patent No.: US 9,699,518 B2
(45) Date of Patent: Jul. 4, 2017

(54) INFORMATION PROCESSING APPARATUS, INFORMATION PROCESSING SYSTEM, RECORDING MEDIUM, AND METHOD FOR TRANSMISSION AND RECEPTION OF MOVING IMAGE DATA

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/665,300

(22) Filed: Mar. 23, 2015

(65) Prior Publication Data

US 2015/0195625 A1    Jul. 9, 2015

Related U.S. Application Data

(63) Continuation of application No. PCT/JP2012/076255, filed on Oct. 10, 2012.

(51) Int. Cl.
*H04N 21/647* (2011.01)
*H04N 21/2343* (2011.01)
(Continued)

(52) U.S. Cl.
CPC ..... *H04N 21/64792* (2013.01); *H04N 19/132* (2014.11); *H04N 19/164* (2014.11);
(Continued)

(58) Field of Classification Search
None
See application file for complete search history.

(56) References Cited

U.S. PATENT DOCUMENTS 5,072,296 A    12/1991    Lim
6,747,991 B1 *    6/2004    Hemy .............. H04N 21/23418
                                                           370/236
(Continued)

FOREIGN PATENT DOCUMENTS

JP    H08-280009 A    10/1996
JP    H10-155149 A    6/1998
(Continued)

OTHER PUBLICATIONS

International Search Report, mailed in connection with PCT/JP2012/076255 and mailed Nov. 13, 2012 (2 pages).

(Continued)

*Primary Examiner* — Omar S Parra
(74) *Attorney, Agent, or Firm* — Fujitsu Patent Center

(57) ABSTRACT

An information processing apparatus includes a storage unit that stores first moving image data and a processor. The processor performs processes including monitoring a state of a communication network, generating second moving image data in accordance with a result of the monitoring by deleting a frame from the first moving image data in a manner such that a first frame rate indicating a first number of frames per unit time of the first moving image data becomes a second frame rate that is lower than the first frame rate, generating frame information related to the deleted frame, and transmitting the second moving image data and the frame information.

6 Claims, 17 Drawing Sheets

(51) Int. Cl.
| | |
|---|---|
| H04N 21/24 | (2011.01) |
| H04N 21/414 | (2011.01) |
| H04N 21/4425 | (2011.01) |
| H04N 21/6379 | (2011.01) |
| H04N 19/172 | (2014.01) |
| H04N 19/46 | (2014.01) |
| H04N 19/132 | (2014.01) |
| H04N 19/164 | (2014.01) |
| H04N 21/442 | (2011.01) |
| H04N 21/462 | (2011.01) |
| H04N 21/6338 | (2011.01) |
| H04N 19/68 | (2014.01) |

(52) U.S. Cl.
CPC ........... *H04N 19/172* (2014.11); *H04N 19/46* (2014.11); *H04N 21/234381* (2013.01); *H04N 21/2402* (2013.01); *H04N 21/41407* (2013.01); *H04N 21/4425* (2013.01); *H04N 21/44245* (2013.01); *H04N 21/4621* (2013.01); *H04N 21/6338* (2013.01); *H04N 21/6379* (2013.01); *H04N 21/64738* (2013.01); *H04N 19/68* (2014.11)

(56) References Cited

U.S. PATENT DOCUMENTS

| | | | |
|---|---|---|---|
| 2002/0071654 A1 | 6/2002 | Notoya et al. | |
| 2005/0076136 A1 | 4/2005 | Cho et al. | |
| 2006/0039471 A1 | 2/2006 | Dane et al. | |
| 2008/0025390 A1* | 1/2008 | Shi | H04N 19/139 375/240.02 |
| 2009/0083432 A1 | 3/2009 | Saito et al. | |
| 2010/0027663 A1* | 2/2010 | Dai | H04N 19/159 375/240.16 |
| 2010/0094931 A1* | 4/2010 | Hosur | H04N 7/17318 709/203 |
| 2010/0150454 A1* | 6/2010 | Sunahara | H04N 19/70 382/218 |
| 2010/0189063 A1 | 7/2010 | Kokku et al. | |
| 2011/0268185 A1 | 11/2011 | Watanabe et al. | |
| 2012/0191805 A1 | 7/2012 | Fee et al. | |

FOREIGN PATENT DOCUMENTS

| | | |
|---|---|---|
| JP | 2002-238050 A | 8/2002 |
| JP | 2002-344913 A | 11/2002 |
| JP | 2004-040517 A | 2/2004 |
| JP | 2004-112789 A | 4/2004 |
| JP | 2006-333189 A | 12/2006 |
| JP | 2009-060425 A | 3/2009 |
| JP | 2009-302755 | 12/2009 |
| JP | 2010-147678 A | 7/2010 |
| WO | 2010/079790 A1 | 7/2010 |

OTHER PUBLICATIONS

Jinfeng Zhang, et al., "Rate-Distortion Optimized Frame Dropping Based on Dynamic Frame Concealment"; Embedded Computing; Fifth IEEE International Symposium on Embedded Computing; Oct. 6, 2008; 129-134; IEEE; USA.
EESR—Extended European Search Report mailed on Jul. 15, 2015 for European Patent Application No. 12886418.8.
EPOA—Office Action dated Jun. 14, 2016 for corresponding European Patent Application No. 12886418.8.
JPOA—Office Action dated Oct. 4, 2016 for corresponding Japanese patent application No. 2014-540685, with English translation of the relevant part, p. 1, line 18—p. 2, line 30 of the Office Action.
EPOA—European Office Action dated Jan. 27, 2017 for corresponding European Patent Application No. 12886418.8.
JPOA—Japanese Office Action dated May 2, 2017 for corresponding Japanese Patent Application No. 2014-540685, with machine translation of the Office Action.

* cited by examiner

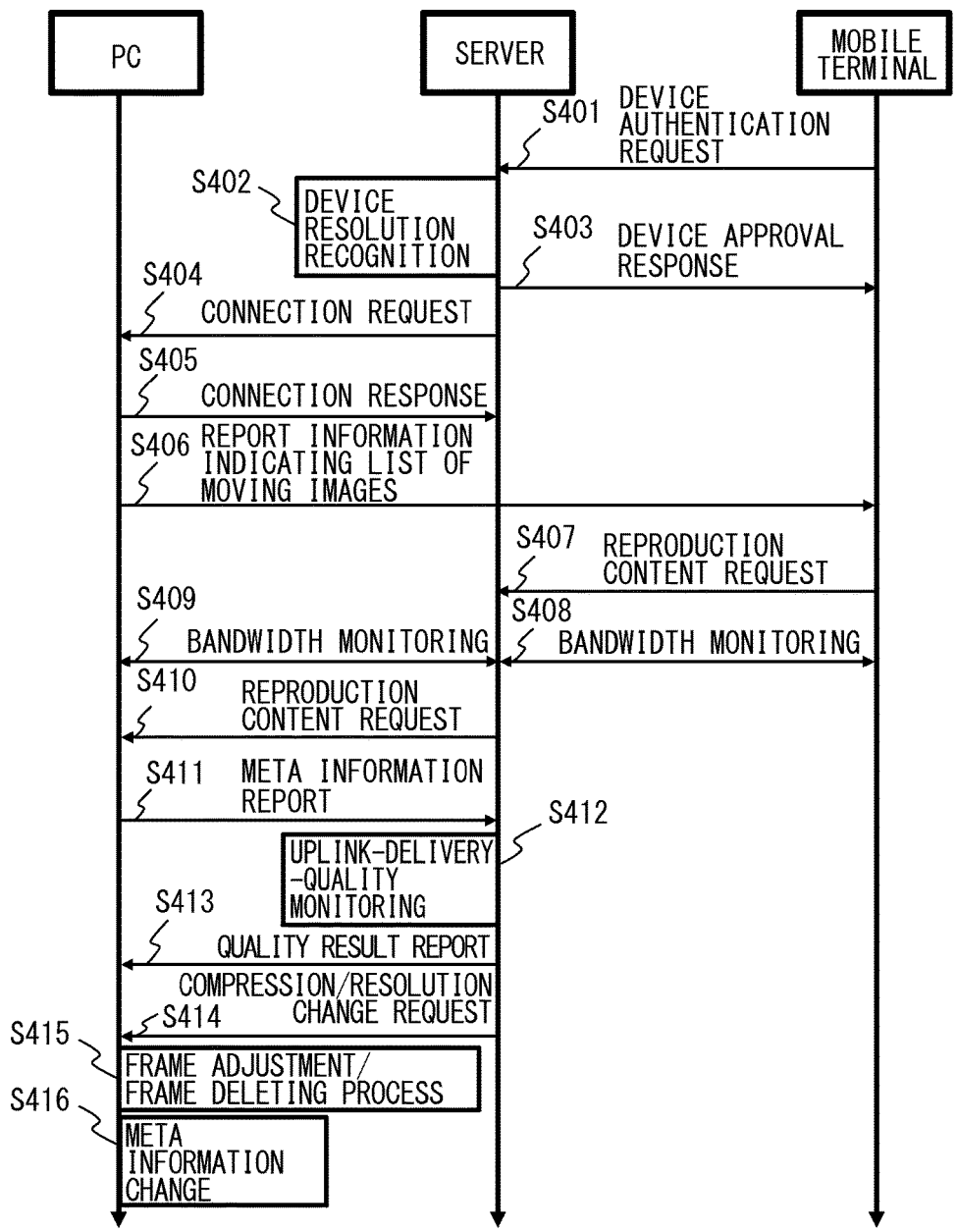
F I G. 4 A

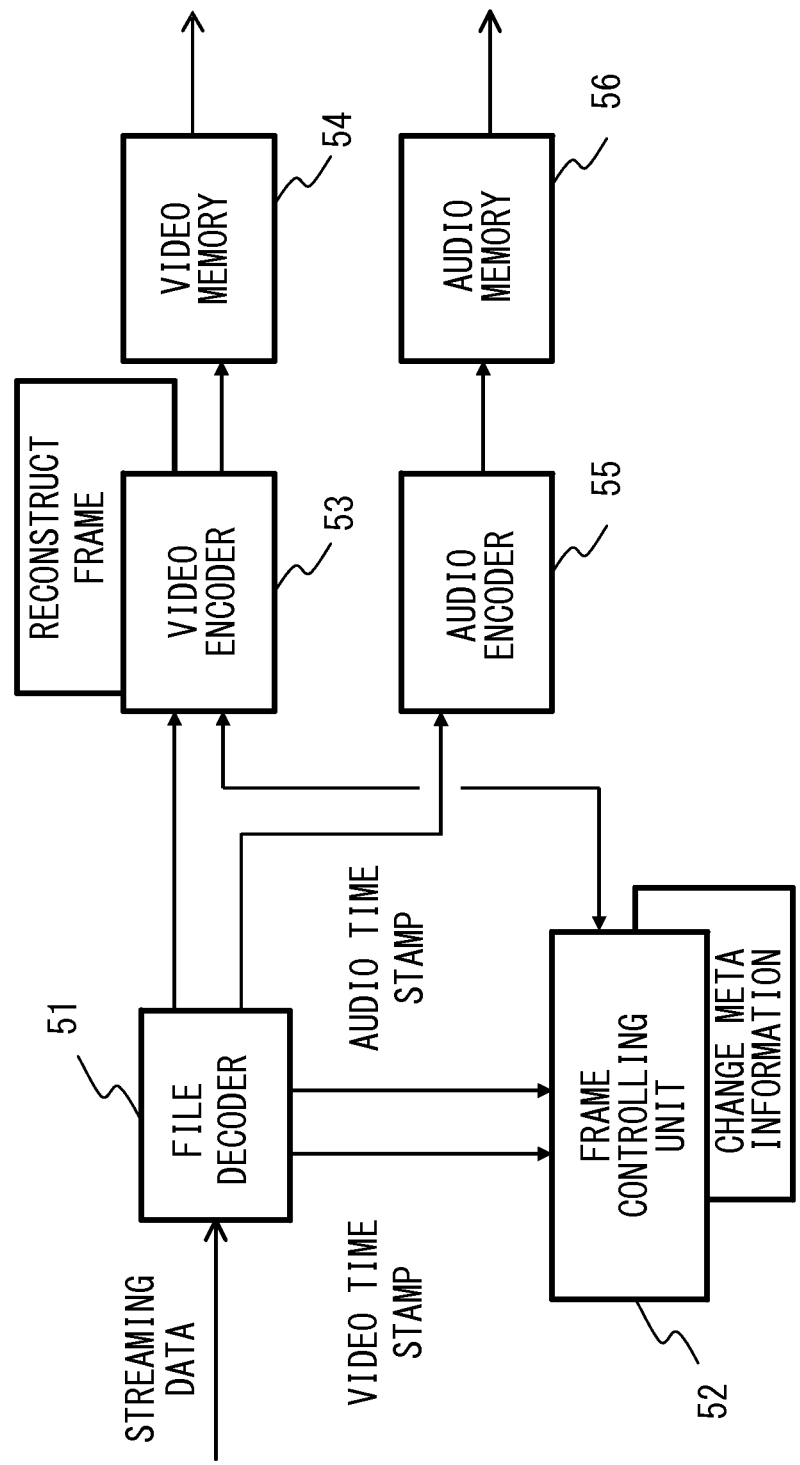
F I G. 5

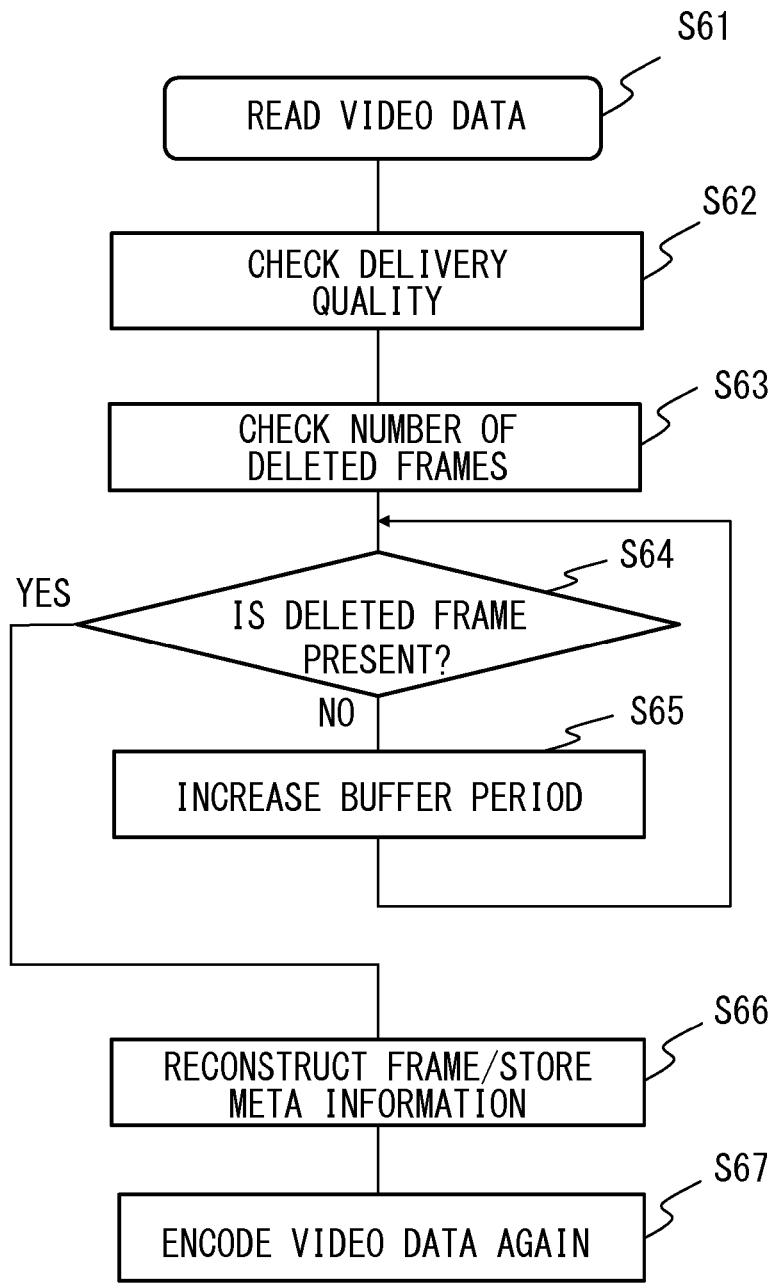
F I G. 6

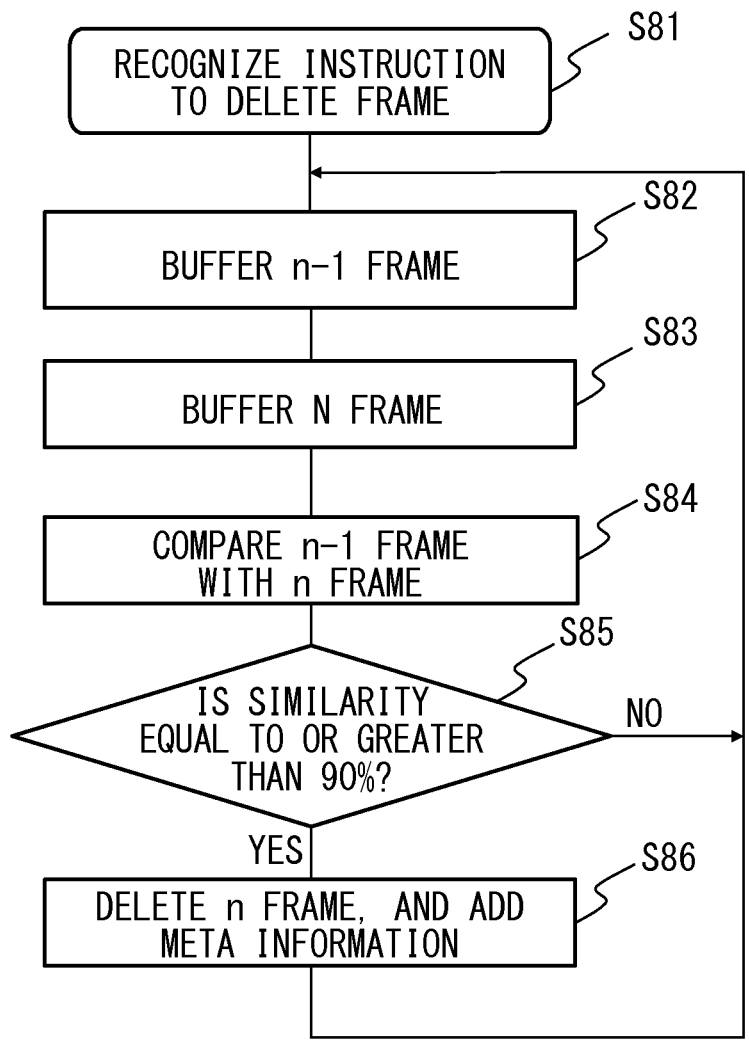
F I G. 8

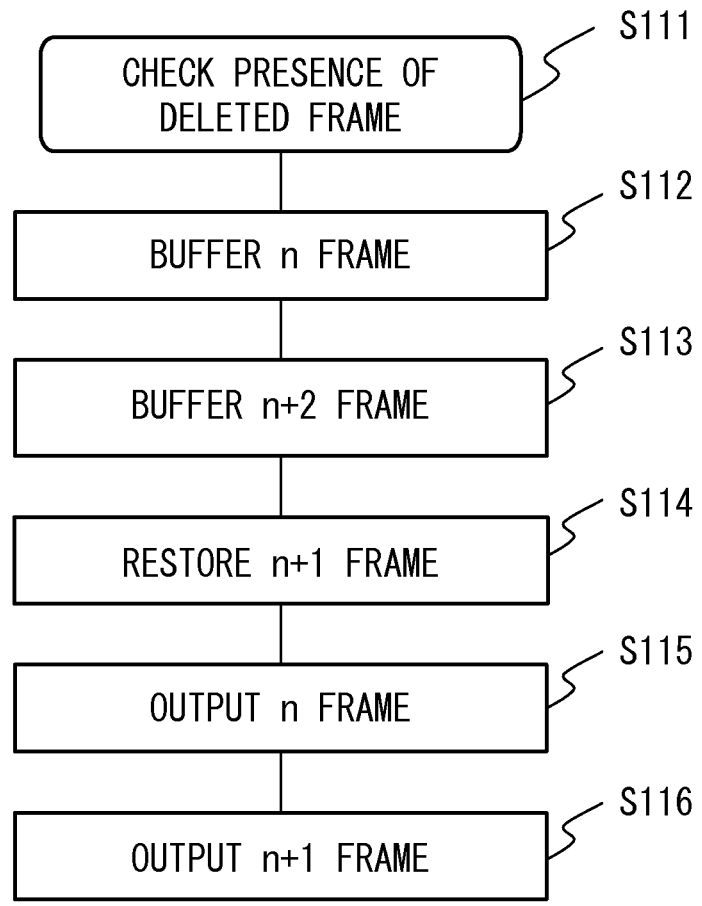
F I G. 1 2

INFORMATION PROCESSING APPARATUS, INFORMATION PROCESSING SYSTEM, RECORDING MEDIUM, AND METHOD FOR TRANSMISSION AND RECEPTION OF MOVING IMAGE DATA

CROSS-REFERENCE TO RELATED APPLICATIONS

This application is a continuation application of International Application PCT/JP2012/076255 filed on Oct. 10, 2012 and designated the U.S., the entire contents of which are incorporated herein by reference.

FIELD

The embodiments discussed herein are related to a technology for transmitting and receiving moving image data.

BACKGROUND

Presently, some battery-powered mobile terminal devices (hereinafter referred to as mobile terminals) that can be used outdoors, e.g., smartphones, have a graphic feature that allows moving images shot using, for example, an installed camera to be watched using the mobile terminal. Such mobile terminals also have a moving image reproduction function and an Internet connection function and enable contents of a moving image site on the Internet to be watched. Mobile terminals have been provided that enable the viewing of personal pictures and moving images obtained over the Internet and stored in, for example, an auxiliary storage apparatus of a home-use personal computer (hereinafter referred to as a PC).

The frame rate of TV moving image contents is, for example, 24 fps (frame per second), and transferring such moving image contents remarkably increases network traffic. In some network environments, transferring TV moving image contents excessively suppresses a LAN (Local Area Network) bandwidth, and this could possibly lead to a network delay. In many cases, domestic LANs have a narrow bandwidth and are thus likely to cause a network delay.

Watching moving images obtained over the Internet and saved in a PC using a mobile terminal in a streaming format could make a network transmission rate lower than a moving image reproduction rate, leading to a risk of a frame loss in the reproducing of the moving images.

A method for preventing such a frame loss could provide a buffer for hardware of a mobile terminal for displaying video images. However, portable terminals cannot secure a space for implementing a sufficient buffer to receive moving images.

A system provides multimedia streaming services while adaptively changing a transmission rate in accordance with a change in network bandwidth. The system includes a multimedia streaming server and a multimedia streaming client. In accordance with network bandwidth information input from outside and a result of analysis of metadata corresponding to multimedia data to be supplied, the multimedia streaming server streams multimedia data corresponding to a predetermined service quality level. Using size information of the multimedia data and a time at which the multimedia data is received, the multimedia streaming client measures bandwidth of a network to which the multimedia streaming server is connected. The multimedia streaming client transmits the measured network bandwidth information to the multimedia streaming server.

An information processing system performs the following traffic control. The information processing system includes a moving image delivery server, a relay server that includes a moving image reproduction program for reproducing moving image data delivered from the moving image delivery server, and a client terminal that receives, from the relay server, screen information associated with reproduction data for the moving image data and that displays corresponding images on a screen. The information processing system controls traffic of a communication between the moving image delivery server, the relay server, and the client terminal. The information processing system includes quality measuring means for measuring a communication quality on a communication line A between the relay server and the client terminal. The information processing system also includes upstream specifying means for specifying an amount of delivered moving image data within a communication line B between the moving image delivery server and the relay server, i.e., an amount corresponding to an amount of screen information of a communication data amount accepted with regard to the measured communication quality a of the communication line A. The information processing system further includes upstream control means for performing control such that an amount of moving image data to be delivered to the relay server from the moving image delivery server via the communication line B can be adjusted to the specified amount of moving image data.

PRIOR ART DOCUMENTS

Patent Documents

Patent document 1: Japanese Laid-open Patent Publication No. 2004-112789
Patent document 2: Japanese Laid-open Patent Publication No. 2009-060425
Patent document 3: Japanese Laid-open Patent Publication No. 10-155149

SUMMARY

According to an aspect of the embodiment, an information processing apparatus includes a storage unit that stores first moving image data and a processor. The processor performs processes including monitoring a state of a communication network, generating second moving image data in accordance with a result of the monitoring by deleting a frame from the first moving image data in a manner such that a first frame rate indicating a first number of frames per unit time of the first moving image data becomes a second frame rate that is lower than the first frame rate, generating frame information related to the deleted frame, and transmitting the second moving image data and the frame information.

According to an aspect of the embodiment, an information processing apparatus includes a processor. The processor performs processes including receiving second moving image data and frame information, generating a complementary image and generating moving image data. The second moving image data is generated by deleting a frame from first moving image data in a manner such that a first frame rate indicating a first number of frames per unit time of the first moving image data becomes a second frame rate that is less than the first number of frames. The frame information is related to the deleted frame. The generating a complementary image generates the complementary image for complementing an image of the deleted frame by using the frame information. The generating moving image data generates the moving image data having the first frame rate by inserting the complementary image at a position of the deleted frame of the second moving image data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4A illustrates an exemplary sequence diagram of an information processing system in accordance with the embodiment (example 1);

FIG. 5 illustrates an adjustment of a frame rate made by a terminal that transmits moving image data;

FIG. 6 illustrates a flowchart of a process of decreasing frames;

FIG. 8 illustrates an operation flowchart of the deleting of frames performed by a transmitting terminal;

FIG. 12 illustrates an operation flowchart of the restoring of a frame performed by a receiving terminal;

DESCRIPTION OF EMBODIMENTS

However, in all of the configurations described above, the quality of a streaming service changes with a network bandwidth. Hence, in a network environment where a moving-image reproduction rate is lower than a transmission rate, the quality of a reproduced image is low in comparison with the image quality of original data before transmission.

Accordingly, in one aspect, an object of this embodiment is to improve a reproduction quality for moving image data transmitted from storage over a network with a narrow bandwidth.

Figure 1:
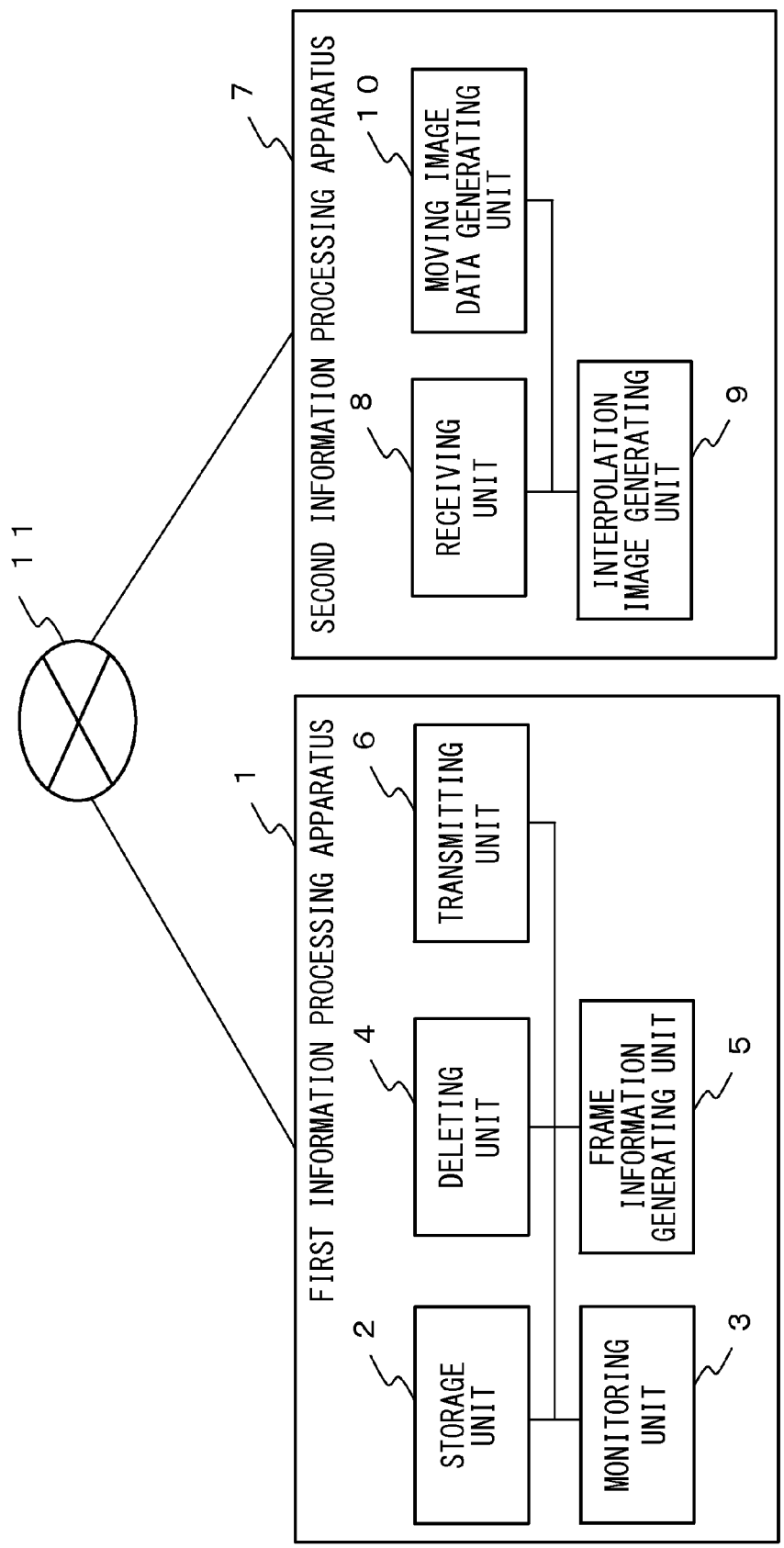
FIG. 1 illustrates an exemplary block diagram of an information processing system in accordance with an embodiment.

FIG. 1 illustrates an exemplary functional block diagram of an information processing system in accordance with the embodiment. A first information processing apparatus 1 includes a storage unit 2, a monitoring unit 3, a deleting unit 4, a frame information generating unit 5, and a transmitting unit 6. The storage unit 2 stores first moving image data. The monitoring unit 3 monitors a state of a communication network 11. The monitoring unit 3 also monitors a bandwidth of the communication network 11.

In accordance with a result of the monitoring, the deleting unit 4 generates second moving image data by deleting a frame from the first moving image data in a manner such that a first frame rate indicating a first number of frames per unit time of the first moving image data becomes a second frame rate that is lower than the first frame rate. The deleting unit 4 also deletes, from among successive frames, a frame indicating a similarity that is equal to or greater than a predetermined threshold. The deleting unit 4 adjusts the second frame rate by deleting a frame and adjusts the resolution of moving image data so as to make the transmission rate of moving image data to be delivered equal to or lower than a predetermined value adapted to the bandwidth.

The frame information generating unit 5 generates frame information related to deleted frames. The frame information generating unit 5 adds the frame information to meta information related to the second moving image data. The frame information includes a start number of the deleted frames and a period thereof. The transmitting unit 6 transmits the second moving image data and the frame information. The transmitting unit 6 also transmits the meta information.

A second information processing apparatus 7 includes a receiving unit 8, a complementary image generating unit 9, and a moving image data generating unit 10. The receiving unit 8 receives second moving image data generated by deleting a frame from the first moving image data in a manner such that a first frame rate indicating a first number of frames per unit time of the first moving image data becomes a second frame rate that is less than the first number of frames, and receives frame information related to the deleted frame. Using the frame information, the complementary image generating unit 9 generates a complementary image for complementing the image of the deleted frame. The complementary image generating unit 10 also generates a complementary image according to change points between frames preceding and following the deleted frame. The moving image data generating unit 10 generates moving image data having the first frame rate by inserting the complementary image at a position of the deleted frame of the second moving image data.

Such a configuration allows a transmission rate or frame rate of moving image data to be changed in accordance with the bandwidth of a network. In addition, moving image data is received via a network environment where the transmission rate of moving images is lower than the reproduction rate thereof, and, even when a sufficient buffer to reproduce moving images cannot be secured on the reception side, moving image data can be reproduced at the frame rate of the original moving image data before transmission. Frames deleted prior to transmission are those selected from successive frames and indicating a similarity that is equal to or greater than a predetermined threshold, and accordingly the quality of moving image data restored on the reception side is improved.

Figure 2:
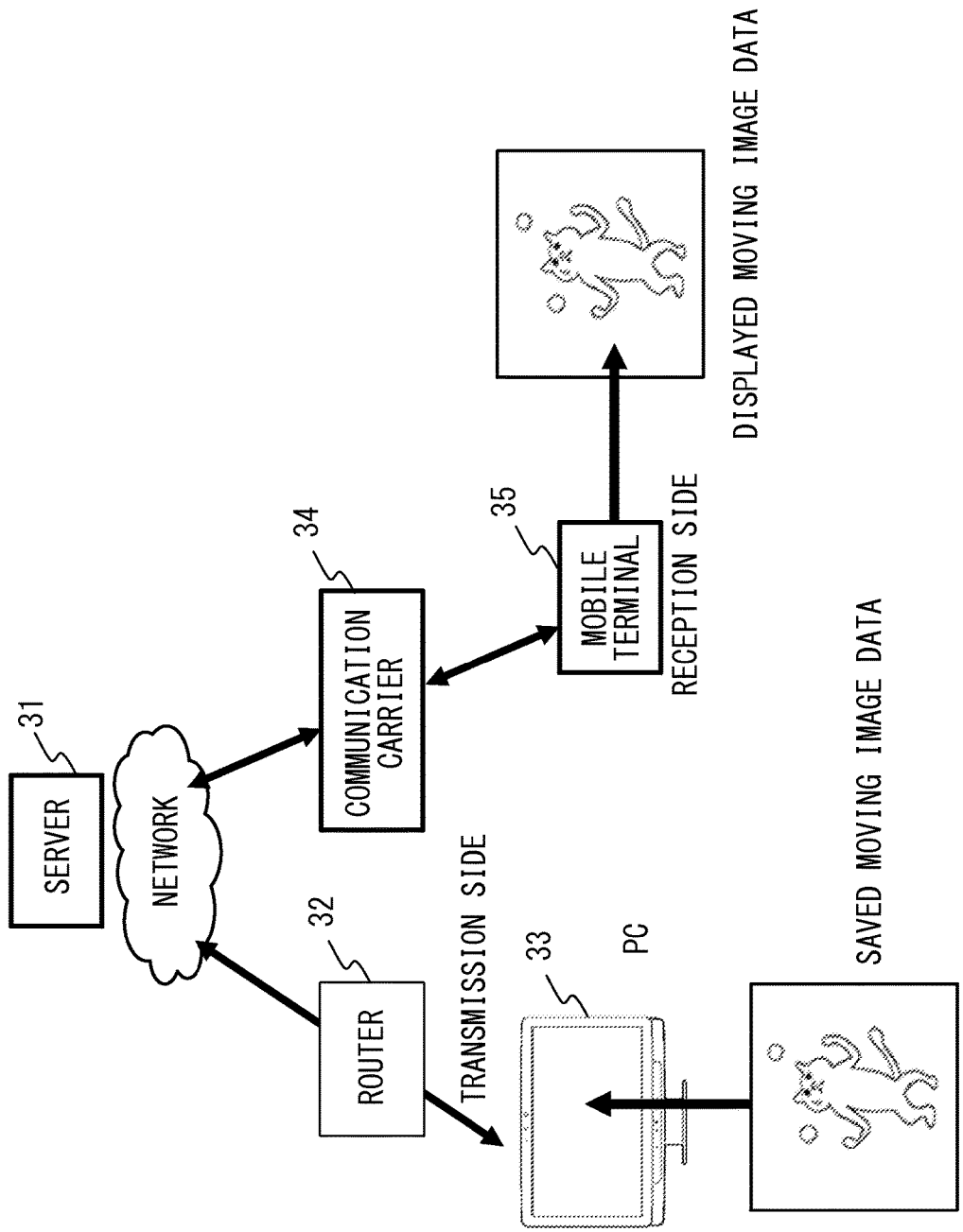
FIG. 2 illustrates an exemplary configuration of an information processing system in accordance with the embodiment.

The following will describe an exemplary system configuration in accordance with an embodiment. FIG. 2 illustrates an exemplary configuration of an information processing system in accordance with the embodiment.

The information processing system includes a PC 33 that saves moving image data, a server 31 that receives moving image data from the PC 33 and transfers the received data to a mobile terminal 35, and the mobile terminal 35, which is capable of reproducing the moving image data received from the server 31. The PC 33 is an example of the first information processing apparatus. The server 31 is an example of the first or second information processing apparatus. The mobile terminal 35 is an example of the second information processing apparatus. The PC 33 on a domestic-LAN (Local Area Network) side is connected to a WAN (Wide Area Network) by a router 32. The mobile terminal 35 and the server 31 are connected to each other by a communication carrier 34.

The PC 33 is installed in, for example, one's home and is connected to the server 31 over a network. The PC 33 stores moving image data that the mobile terminal 35 accesses via the server 31. An authentication function restricts access from the server 31 to the PC 33. For each server 31 accessed, the PC 33 holds a file that includes information indicating a list of moving image files that can be provided to the server 31. Alternatively, for each mobile terminal 35 that accesses the server 31, the PC 33 may hold a file that includes information indicating a list of moving image files that can be provided to the mobile terminal 35. The PC 33 receives a result of the monitoring of a state of the network from the server 31, deletes a frame of a moving image file in accordance with a monitoring status, and delivers the moving image file to the server 31. The PC 33 may be a host computer having the function of the server 31, or may be a storage apparatus storing moving image files and connected to the network.

The server 31 is connected to the PC 33 and the mobile terminal 35 over the network. The server 31 receives from the mobile terminal 35 a watch request for a moving image file saved in the PC 33. The server 31 has an authentication function for establishing a connection to the mobile terminal 35. The server 31 obtains from the PC 33 the moving image file for which the watching request has been made, and transfers the obtained moving image file to the mobile terminal 35. The server 31 has a function to comprehensively monitor network bandwidths between the server 31 and the mobile terminal 35 and between the server 31 and the PC 33. The server 31 deletes a frame of the moving image file in accordance with the monitoring status of the network and then delivers the moving image file to the mobile terminal 35.

The mobile terminal 35 is connected to the server 31 over the network. The mobile terminal 35 receives designation of a reproduction moving image saved in the PC 33 from the user. The mobile terminal 35 also receives designation of the resolution of the moving image to be reproduced from the user. The mobile terminal 35 receives moving image data from the server 31 in a streaming format. When a frame of the received moving image data has been deleted before transmission, the mobile terminal 35 generates a complementary image corresponding to the frame, and incorporates the generated complementary frame into the moving image data. This irreversibly restores the moving image data before the deletion of the frame made by the PC 33. The mobile terminal 35 reproduces the restored moving image data. By performing the restoring process, the mobile terminal 35 reproduces moving image data at the same frame rate as that of the moving image data saved in the PC 33.

Delivering data from the PC 33 to the server 31 may hereinafter be referred to as "uplink (upload)", and transmitting data from the server 31 to the mobile terminal 35 may hereinafter be referred to as "downlink (download)". The PC 33 or server 31 that is a source of moving image data may hereinafter be referred to as a transmitting terminal. The server 31 or mobile terminal 35 that receives moving image data may hereinafter be referred to as a receiving terminal. A frame deleted by the PC 33 may hereinafter be referred to as a deleted frame.

Figure 3:
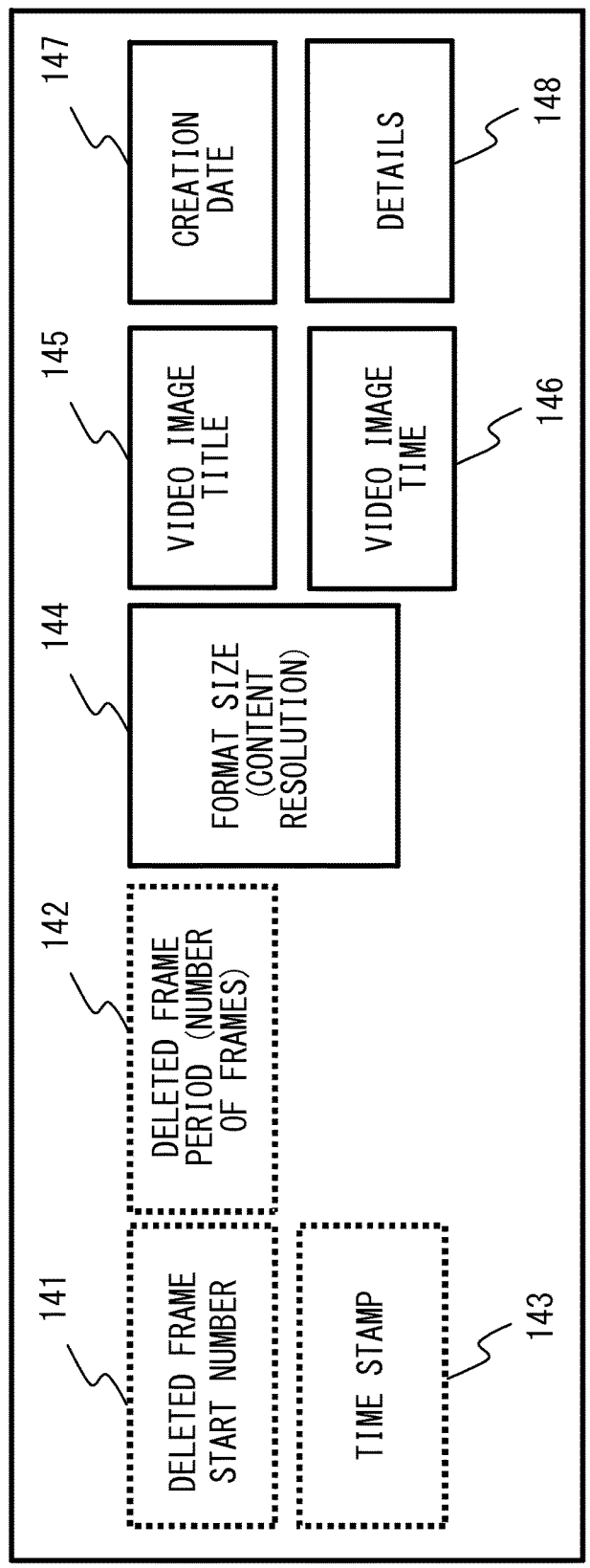
FIG. 3 illustrates an exemplary structure of meta information of video data.

The following will describe the structure of meta information of video data. Meta information of video data is transmitted from a transmitting terminal to a receiving terminal together with the video data. The PC 33 adds information on a deleted frame to meta data. The mobile terminal 35 restores moving image data using the meta information. FIG. 3 illustrates an exemplary structure of meta information of video date.

Meta information relates to moving image data and is associated with moving image data. Meta information includes a format size (content resolution) 144, a video image title 145, a video image time 145, a creation date 147, details 148, a deleted frame start number 141, a deleted frame period (the number of frames) 142, and a time stamp 143.

The format size (content resolution) 144, the video image title 145, the video image time 146, the creation date 147, and the details 148 are included in moving image data saved in the PC 33. The format size (content resolution) 144, the video image title 145, the video image time 146, the creation date 147, and the details 148 are respectively the format size (content resolution), video image title, video image time, creation date, and details of corresponding moving image data saved in the PC 33.

The deleted frame start number 141, the deleted frame period (the number of frames) 142, and the time stamp 143 are data items added to meta data when a frame is deleted by a transmitting terminal. The deleted frame start number 141 is the frame number of a frame deleted by the transmitting terminal. The deleted frame period (the number of frames) 142 indicates a period in the case of deleting successive frames, and is expressed by, for example, successive numbers of deleted frames. The time stamp 143 is a time stamp of a deleted frame. The time stamp 143 sets a time (expressed in seconds) for each video image frame since the start of reproduction.

The deleted frame start number 141, the deleted frame period (the number of frames) 142, and the time stamp 143 are information on a deleted frame generated for each predetermined period (e.g., every second). Hence, when a plurality of frames are deleted during the predetermined period, data items of the deleted frame start number 141, deleted frame period 142, and time stamp 143 associated with each deleted frame are added to meta information.

The deleted frame start number 141, the deleted frame period (the number of frames) 142, and the time stamp 143 may be the frame number of a restart frame, the period (the number of frames) of the restart frame, and the time stamp of the restart frame. In the embodiment, successive video image frames are deleted, and, as long as information on the frame number of a starting frame and a frame period thereof is present, the start number and period of a frame to be deleted in video image reproduction performed by the mobile terminal 35 can be recognized in advance. Accordingly, in the mobile terminal 35, the start number and period of the deleted frame may be complemented. The deleted frame start number 141 and the time stamp of an audio frame corresponding to a deleted frame start number 141 may serve as a complement to the time stamp 143, and in this case, meta information does not need to include the time stamp 143.

Figure 4B:
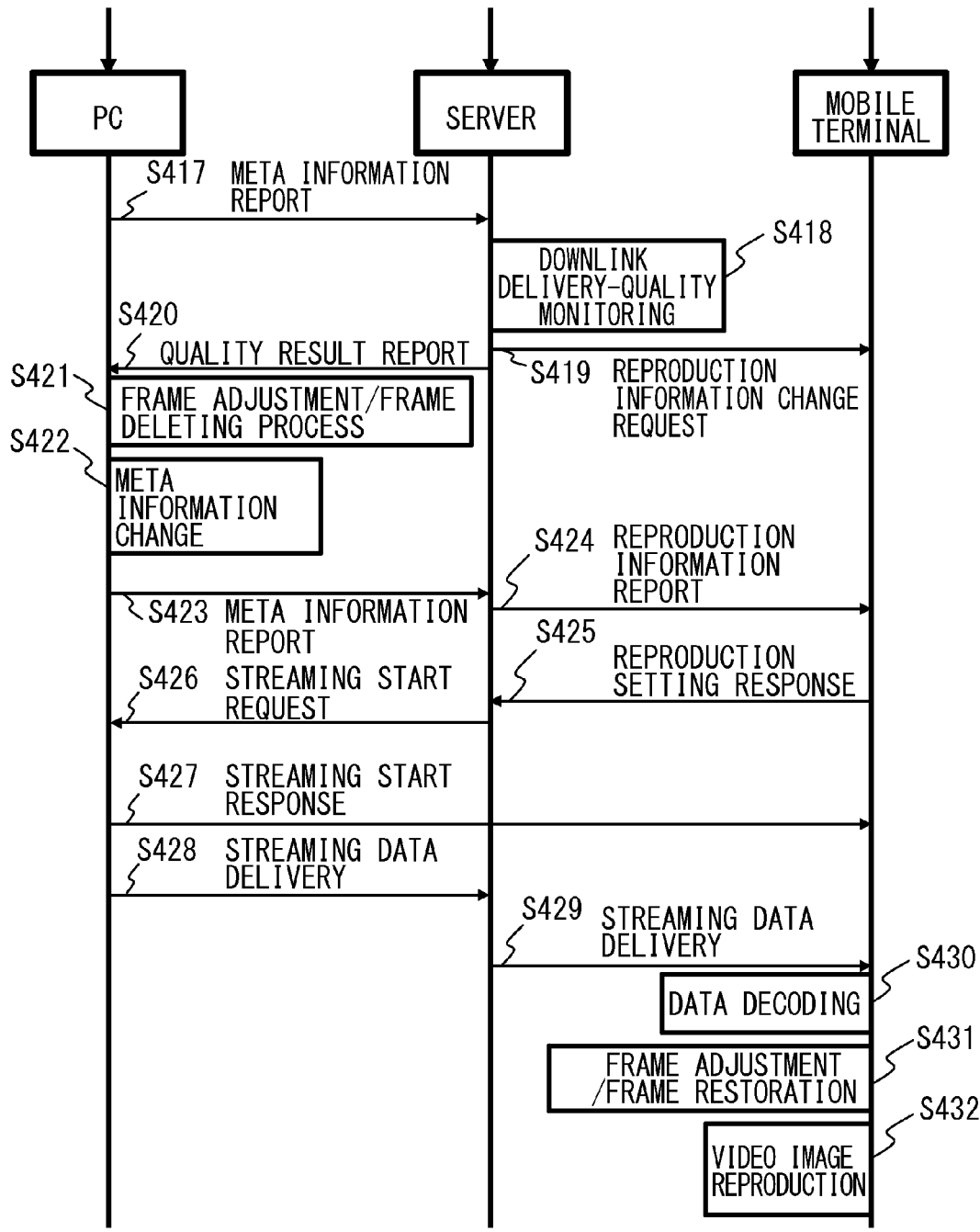
FIG. 4B illustrates an exemplary sequence diagram of an information processing system in accordance with the embodiment (example 2)

FIGS. 4A and 4B illustrate a sequence diagram of an information processing system in accordance with the embodiment. FIGS. 4A and 4B illustrate an operation relationship between the PC 33 in which moving image data is saved, the mobile terminal 35 with which moving image data obtained from the PC 33 can be watched, and the server 31 that relays data transferred between the mobile terminal 35 and the PC 33.

To obtain moving image data saved in the PC 33, the mobile terminal 35 establishes a connection to the server 31 that relays data transferred between the mobile terminal 35 and the PC 33 (S401). Before the connection is established, the server 31 performs authentication to check the validity of the mobile terminal 35 that has made the connection request (S402). Simultaneously with performing authentication of the mobile terminal 35, the server 31 recognizes the resolution of the mobile terminal 35. When the authentication succeeds, the server 31 sends a device approval response to the mobile terminal 35 (S403).

The server 31 establishes a connection to the PC 33 in which moving image data requested by the mobile terminal 35 is saved (S404). Before a connection is established between the PC 33 and the server 31, authentication is also performed to check the validity of the connection. When the authentication succeeds, the PC 33 transmits a connection response to the server 31 (S405).

The PC 33 reports, via the server 31 and to the mobile terminal 35, information indicating a list of moving images that can be provided (S406). A list of moving images that can be provided may be set in advance for each of the mobile terminals 35 or for each of the servers 31, and may be saved in the PC 33 as a file. The PC 33 may receive information on the resolution of the mobile terminal 35 from the server 31 and, in accordance with the information, may determine a moving image that the mobile terminal 35 can reproduce.

When the reported list is displayed on the screen of the mobile terminal 35, the user operates the mobile terminal 35 to select a moving image to be reproduced. The mobile terminal 35 sends to the server 31 a delivery request for the selected moving image to be reproduced (hereinafter referred to as a reproduction moving image request) (S407).

The server 31 performs an information collecting task for monitoring network bandwidths between the mobile terminal 35 and the server 31 and between the PC 33 and the server 31 (S408 and S409).

The server 31 transmits to the PC 33 the reproduction moving image request received from the mobile terminal 35 (S410). Upon receipt of the reproduction moving image request, the PC 33 reports, to the server 31, meta information related to the moving image designated by the reproduction moving image request (S411).

The server 31 performs monitoring of the quality of transmission of moving images between the PC 33 and the server 31 (hereinafter referred to as uplink-delivery-quality monitoring) (S412). In particular, the frame rate of moving image data is determined such that the amount of moving image data transmitted by the PC 33 falls within a range in which data can be stably transmitted or received. That is, the server 31 determines an adjustment amount for adjusting the frame rate of moving image data to be transmitted in a manner such that the bandwidth used for transfer of moving images becomes equal to or less than the network bandwidth.

The server 31 reports to the PC 33 the frame rate of the moving image to be transmitted, i.e., a frame rate determined in the delivery quality monitoring (S413). In addition, the server 31 reports to the PC 33 the resolution of the mobile terminal 35 recognized in S402 and instructs the PC 33 to change a resolution for moving image data in conformity with the resolution of the mobile terminal 35 (S414).

Upon receipt of a result of uplink-delivery-quality monitoring and a resolution change request, in accordance with the received result and request, the PC 33 changes the resolution and adjusts the frame rate of a delivery moving image (S415). The frame rate is adjusted by deleting a frame according to a similarity between successive frames. The PC 33 adds information on the deleted frame to meta information, and reflects information on the changed resolution in the meta information (S416). The PC 33 reports the changed meta information to the server 31 (S417).

Upon receipt of the mete information from the PC 33, the server 31 performs quality monitoring of transmission of a moving image between the server 31 and the mobile terminal (hereinafter referred to as downlink-delivery-quality monitoring) (S418). In particular, the server 31 determines an adjustment amount for adjusting the frame rate of moving image data to be transmitted in a manner such that a bandwidth used for transferring the moving image is equal to or less than the network bandwidth between the server 31 and the mobile terminal 35. In this case, the server 31 reports change information of moving image data changed by the PC 33 to the mobile terminal 35 as a reproduction information change request such that, in the reproducing of the moving image, the mobile terminal 35 can recognize the change information of moving image data changed by the PC 33 (S419). The server 31 reports to the PC 33 the frame rate of the transmitted moving image determined through the downlink-delivery-quality monitoring (S420).

Upon receipt of a result of downlink delivery quality, in accordance with the received result, the PC 33 adjusts the frame rate of the delivery moving image (S421). The frame rate is adjusted by deleting a frame according to a similarity between successive frames. The PC 33 adds information on the deleted frame to meta information (S422). The PC 33 reports the changed meta information to the server 31 (S423).

The server 31 reports change information of the delivery moving image to the mobile terminal 35 (S424). Upon receipt of a reproduction information report from the server 31, the mobile terminal 35 recognizes the change in the delivery moving image and sends a reproduction setting response to the server 31 (S425).

The server 31 reports a streaming start request to the PC 33 (S426). Upon receipt of the streaming start request from the server 31, the PC 33 transmits a streaming start response to the mobile terminal 35 via the server 31 (S427). The PC 33 delivers streaming data to the server 31 (S428). Upon receipt of the streaming data, the server 31 delivers the streaming data to the mobile terminal 35 (S429).

Upon receipt of the streaming data, the mobile terminal 35 decodes the received data (S430). The mobile terminal 35 restores moving image data by generating and inserting complementary frames corresponding to the frames deleted in S415 and S421 into the moving image data (S431). The mobile terminal 35 reproduces the restored moving image data (S432).

The operations of S408-S432 are performed for each predetermined amount of data, the PC 33 performs streaming delivery of moving image data, and the mobile terminal 35 reproduces moving image data.

In FIGS. 4A and 4B, the server 31 reports results of uplink-delivery-quality monitoring and downlink-delivery-quality monitoring separately to the PC 33. However, the server 31 may simultaneously perform uplink-delivery-quality monitoring and downlink-delivery quality monitoring, and may simultaneously report both results to the PC 33. In this case, the server 31 compares the frame rate of a delivery moving image determined through the uplink-delivery-quality monitoring and the frame rate of a delivery moving image determined through the downlink-delivery-quality monitoring, and reports the lower frame rate to the PC 33. The PC 33 adjusts the frame rate of the delivery moving image in conformity with the received frame rate.

In FIG. 4, the PC 33 performs the operations for adjusting the frame rate of a delivery moving image in response to a result of downlink-delivery-quality monitoring (S421 and S422). However, such operations may be performed by the server 31 after the server 31 receives streaming data from the PC 33 (S428). Before performing the operations for adjusting the frame rate (S412 and S422), the PC 33 may inquire with the mobile terminal 35 as to whether to change the frame rate. In this case, the mobile terminal receives from the user an instruction as to whether to adjust the frame rate, and transfers the result to a mobile terminal. The mobile terminal 35 may receive an instruction to change the resolution of the moving image instead of adjusting the frame rate or an instruction to change a line to be connected, and may transfer the result to a mobile terminal.

The following will describe in detail the operation for establishing connections between the mobile terminal 35 and the server 31 and between the server 31 and the PC 33 (S401 and S404).

The mobile terminal 35 has an application program for reproducing a moving image (hereinafter referred to as an application) installed thereon, and is connected to a target server 31 in accordance with the application. The target server 31 may be selected by a user, or may be designated by the application in advance. In the establishing of a connection according to, for example, a 3G (3rd Generation) line, the mobile terminal 35 may designate the line so as to establish a connection to the Internet. A P2P (Peer to Peer) connection can be established between the mobile terminal 35 and the PC 33 over the Internet.

Authentication is performed in establishing a connection between the server 31 and the mobile terminal 35 or between the server 31 and the PC 33, and used authentication information is, for example, IP addresses of the devices and specific device information such as MAC addresses of the devices. Authentication information is managed on the server 31. The authentication information associates an IP address and specific device information with the mobile terminal 35 and the PC 33 to which the mobile terminal 35 is connectable. The authentication information is grouped and stored for each mobile terminal 35. Note that one PC 33 may be associated with one mobile terminal 35, or may be associated with a plurality of mobile terminals 35.

The following will describe an operation performed in establishing a connection between the mobile terminal 35 and the server 31. Upon receipt of a connection request from a mobile terminal 35, the server 31 compares an IP address or specific device information of the mobile terminal 35 that has made the connection request with an IP address or specific device information saved in the server 31. When the compared elements are identical with each other, the server 31 judges the authentication to be successful and establishes the connection. Various authentication techniques may be used for authentication. For example, a password authentication scheme or an electronic certificate authentication scheme may be used.

The following will describe an operation performed in establishing a connection between the server 31 and the PC 33. After establishing a connection to the mobile terminal 35, the server 31 establishes a connection to the PC 33 associated with the mobile terminal 35. In particular, when authentication information saved in the server 31 associates one PC 33 with one mobile terminal 35, the server 31 checks the authentication information so as to establish a connection to the PC 33 associated with the mobile terminal 35. Alternatively, in establishing a connection to the server 31, the mobile terminal 35 may designate a PC 33, and the server 31 may be connected to the designated PC 33.

Upon receipt of a connection request from a server 31, the PC 33 performs authentication as to whether the server 31 that has made an access request is authentic. Various authentication techniques are used for the authentication, as in the case of authentication performed by the server 31 for the mobile terminal 35. Alternatively, access control may be performed by setting access permission for a moving image file held by the PC 33 and a directory (folder) of the PC 33.

Connections between the PC 33 and the server 31 and between the server 31 and the mobile terminal 35 may be established using a high-security network technique such as a VPN (Virtual Private Network). In addition, for data transmissions between the PC 33 and the server 31 and between the server 31 and the mobile terminal 35, transmitted data may be encrypted using various encryption techniques. The server 31 and the PC 33 may be provided within an identical intranet.

The following will describe in detail the information collecting task performed by the server 31 to monitor network bandwidths (S408 and S409).

The server 31 monitors bandwidths between the mobile terminal 35 and the server 31 and between the PC 33 and the server 31. First, the monitoring of the bandwidth between the mobile terminal 35 and the server 31 will be described.

To detect a bandwidth of a network connected to the mobile terminal 35, the server 31 transmits a packet for detection of the bandwidth to the mobile terminal 35. The transmitted packet has recorded therein a time at which the server 31 transmitted this packet. When the mobile terminal 35 receives the packet, the mobile terminal 35 checks and compares a reception time with the transmission time recorded in the packet. This allows the mobile terminal 35 to calculate the time needed to transmit a certain amount of packets from the server 31 to the mobile terminal 35. The mobile terminal 35 transfers obtained bandwidth monitoring information to the server 31. Note that the server 31 may divide a certain amount of data into a plurality of packets, and may obtain bandwidth monitoring information by measuring the time period from the transmission of an initial packet from the server 31 to the reception of a final packet at the mobile terminal 35.

The following will describe the monitoring of a bandwidth between the PC 33 and the server 31. The server 31 instructs the PC 33 to transmit a packet for the monitoring of the bandwidth to the server 31. Upon receipt of the instruction, the PC 33 transmits a packet for detection of the bandwidth to the server 31. The transmitted packet has recorded therein a time at which the PC 33 transmitted this packet. When the server 31 receives the packet, the server 31 checks and compares a reception time with the transmission time recorded in the packet. This allows the server 31 to calculate the time needed to transmit a certain amount of packets from the PC 33 to the server 31. Note that the PC 33 may divide a certain amount of data into a plurality of packets, and may obtain bandwidth monitoring information by measuring the time period from the transmission of an initial packet from the PC 33 to the reception of a final packet at the server 31.

The packet for the monitoring of the bandwidth is transmitted to the extent that a problem does not occur in actual reproduction of a moving image. The bandwidth may be monitored by transmitting a command for the monitoring of the bandwidth, or may be monitored by measuring a time period from transmission of a command such as "ping" to reception of a response thereto. The PC 33 may simultaneously monitor bandwidths between the PC 33 and the server 31 and between the server 31 and the mobile terminal 35 by transmitting a packet to the mobile terminal 35 via the server 31. In addition to monitoring a bandwidth, traffic of a line may be monitored according to a transmission delay.

For each type of line connected to the Internet, an amount of information stably enabling transmission (or reception) of data per second is defined. Using the defined amount and bandwidth monitoring information, the server 31 determines the amount (used amount) of data that can be stably transmitted or received per unit time.

After the bandwidth monitoring operation is performed (after the processes of S408 and S409 are performed), the server 31 transmits a result of the monitoring to the mobile terminal 35. The user may check the result of the bandwidth monitoring using the mobile terminal 35 so as to designate a resolution for a moving image to be reproduced. In this case, designated resolution information is used for delivery quality monitoring.

The following will describe in detail operations of uplink-delivery-quality monitoring and downlink-delivery-quality monitoring performed by the server 31 (S412 and S418).

In delivery quality monitoring, the server 31 compares the data amount of a moving image to be transmitted with the data amount enabling stable transmission or reception, and determines an adjustment amount for a frame rate of moving image data such that the data amount of the moving image to be transmitted falls within the range of the data amount enabling stable transmission or reception. The determined frame rate for moving image data will hereinafter be referred to as a transmission frame rate.

In uplink-delivery-quality monitoring, an adjustment amount for the frame rate of moving image data to be transmitted is determined in a manner such that the data amount of a moving image transmitted from the PC 33 falls within the range of the data amount enabling stable transmission or reception in the network between the server 31 and the PC 33. First, according to a result of the monitoring of a bandwidth between the server 31 and the PC 33, the server 31 determines a usable bandwidth between the server 31 and the PC 33. Alternatively, the server 31 determines a usable bandwidth according to a result of bandwidth monitoring and a transmission line capacity of it line. Then, the server 31 calculates a transmission bit rate of moving image data from the resolution, bit color, compressibility, and frame rate of moving image data. The server 31 determines a deletion amount for the frame rate of moving image data such that the calculated transmission bit rate falls within the range of the usable bandwidth.

Similarly, in downlink-delivery-quality monitoring, an adjustment amount for the frame rate of moving image data to be transmitted is determined in a manner such that the data amount of a moving image transmitted from the server 31 falls within the range of the data amount enabling stable transmission or reception in the network between the server 31 and the mobile terminal 35. First, according to a result of the monitoring of a bandwidth between the server 31 and the mobile terminal 35, the server 31 determines a usable bandwidth between the server 31 and the mobile terminal 35. Alternatively, the server 31 determines a usable bandwidth according to a result of bandwidth monitoring and a transmission line capacity of a line. Then, the server 31 calculates a transmission bit rate of moving image data from the resolution, bit color, compressibility, activity level, and frame rate of moving image data. The server 31 determines a deletion amount for the frame rate of moving image data such that the calculated transmission bit rate falls within the range of the usable bandwidth. The activity level is a frequency of packet transmission relative to a stream and changes with, for example, the content of moving image data. In the case of, for example, silence video image data, an audio stream does not need to be transmitted, and the activity level thereof is 0.

The following will describe an operation of delivery quality monitoring with reference to a specific example. Assume that a line between the server 31 and the PC 33 is an optical line with a maximum bandwidth of 94 Mbps. In the example below, a codec encodes moving image data at a fixed bit rate.

A bandwidth that can be used to transmit moving images also depends on traffic of another application within a network, and hence the entirety of the bandwidth is not always usable. Accordingly, the server 31 monitors the bandwidth, i.e., calculates the time needed to transmit a certain amount of packets from the PC 33 to the server 31, and recognizes a traffic situation of the network. According to the traffic situation, the ratio of a bandwidth ensured for delivery of moving images to a highest transmission rate of the line is defined as Y %. Assume that Y=1.

Moving image data has, for example, a full HD (full high definition) with a resolution of 1280 [dot per inch (dpi)]×720 [dpi], a bit color of 8, and a frame rate of 24 fps. The moving image data has a bit rate of (1280×727 (resolution))×(3 (RGB)×256 (8-bit color))×24 (frame)=17 Gbps. This value is achieved in a situation in which one frame is not compressed.

A compression scheme based on, for example, MPEG (Moving Picture Experts Group) includes, for example, a full I picture (Intra picture), a ½-size P picture (Predictive picture), and a ¼-size B picture (Bi-directional predictive picture). These pictures are configured at a ratio of 1:4:10. Accordingly, the compressibility of moving image data is about $11/30$. In addition, MPEG-AVG is difference data corresponding to moved portions only and is thus further compressed to about $1/24$. Accordingly, the moving image data is presumed to be compressed to $11/30 \times 1/24 = 11/720$.

In consideration of the compression, the transmission bit rate of the moving image data is 17 Gbps×$11/720$=259 Mbps. The moving image data can be compressed in conformity with the resolution of the mobile terminal 35 that reproduces the image. Assume that the server 31 has recognized a mobile terminal 35 having a resolution of 800×480. In this case, before being transmitted, moving image data may be compressed by 0.42-fold (800×480×/1280×720=0.42).

In a case where original moving image data is a content to be displayed on an apparatus with a high resolution, in reproducing the moving image data on a mobile terminal 35 with a low resolution, decreasing the resolution of the moving image data to the resolution of the mobile terminal 35 does not change the visibility. In many cases, a video image reproduction chip of the mobile terminal 35 is unable to use all information included in moving image data and is thus unable to restore small changes in the video image.

Accordingly, let A indicate a resolution based on the resolution of a mobile terminal 35 recognized by the server 31, and let B indicate the number of frames. The transmission bit rate of moving image data is A×(RGB color frames; 3×256)×B×11/720=(800×480)×3×256)×24×11/720≈108 Mbps, where A=800×400 and B=24.

However, that value is not equal to or less than 94 Mbps, an uplink bandwidth. Accordingly, the transmitting terminal transmits moving image data after deleting frames in a manner such that the transmission bit rate of the moving image data becomes equal to or less than the uplink bandwidth. Let E indicate the ratio of the frames after the deletion to the frames before the deletion. E≤0.87 is satisfied to satisfy 108M×E≤94M. Since 24×E, i.e., 24×0.87, is 20.88, the frame rate of the moving image data to be transmitted may be changed to 20 fps.

The frame deleting process does not need to be performed when a receiving terminal that receives the moving image data secures a sufficient storage region for saving the received data.

In the operation of downlink-quality monitoring for transmitting moving images, as in the case of uplink quality monitoring, an adjustment amount for the frame rate of moving image data to be transmitted is determined in a manner such that the data amount of a moving image to be transmitted falls within the range of the data amount enabling stable transmission or reception.

Assume that a communication standard between the server 31 and the mobile terminal 35 is the LTE (Long Term Evolution); the maximum bandwidth is 75 Mbps; z % is defined as the ratio of a bandwidth secured for delivery of moving images to the maximum transmission rate of a line. In this example, a downlink bandwidth is 77 Mbps, where Z=1.

As described above with reference to the example of uplink, let A indicate a resolution based on the resolution of a mobile terminal 35 recognized by the server 31, and let B indicate the number of frames. The transmission bit rate of moving image data is A×(RGB color frames: 3×256)× B×11/720=(800×480)×(3×256)×24×11/720≈108 Mbps, where A=800×400 and B=24.

Accordingly, the transmitting terminal transmits moving image data after deleting frames in a manner such that the transmission bit rate of the moving image data becomes equal to or less than the downlink bandwidth. Let E indicate the ratio of the frames after the deletion to the frames before the deletion. E≤0.71 is satisfied to satisfy 108M×E≤77M. Since 24×E, i.e., 24×0.71, is 17.04, the frame rate of the moving image data to be transmitted may be changed to 17 fps.

In consideration of the bandwidth between the server 31 and the mobile terminal 35 in addition to the bandwidth between the server 31 and the PC 33, the frame rate between the server 31 and the PC 33 may be adjusted in conformity with the smaller bandwidth of the two. When a plurality of types of network lines are selectable, the server 31 may be configured to switch between lines of different bandwidths in accordance with a result of delivery quality monitoring. In this case, for the transmission rate of moving images calculated through delivery quality monitoring, the server 31 detects and selects a network line enabling stable transmission.

The following will describe an operation for deleting frames of moving image data to be delivered in a manner such that the frame rate of the moving image data becomes equal to or lower than delivery the frame rate determined through delivery quality monitoring.

FIG. 5 illustrates an adjustment of a frame rate made by a terminal that transmits moving image data. The frame rate is adjusted by a terminal that transmits moving images. That is, in this embodiment, the frame rate is adjusted by the PC 33 or the server 31.

A file decoder 51 separates streaming data into video data and audio data. The file decoder 51 outputs the video data obtained via the separating to a video encoder 53, and outputs the audio data obtained via the separating to an audio encoder 55. In addition, the file decoder 51 transmits meta information of the streaming data to a frame controlling unit 52.

The frame controlling unit 52 determines a frame to be deleted from video data in a manner such that the frame rate becomes equal to or lower than a transmission frame rate. The frame controlling unit 52 adds information on the deleted frame to meta information. That is, the frame controlling unit 52 stores information on the deleted frame in the deleted frame start number 141, deleted frame period (the number of frames) 142, and time stamp 143 of the meta information.

Video data output by the file decoder 51 is input to the video encoder 53. The video encoder 53 deletes from the video data the frame determined by the frame controlling unit 52 and reconstructs a frame. The video encoder 53 encodes the reconstructed frame in a format for transmission. The encoded resultant video data is divided or collected into packets in, for example, an RTMP (Real Time Messaging Protocol) format. The video encoder 53 outputs the encoded video data to a video memory 54, from which the encoded video data is transmitted to a receiving terminal.

Meanwhile, the audio video data obtained via the file decoder 51 separating the streaming data is input to the audio encoder 55. The audio encoder 55 converts the received audio data into data in a format for transmission and outputs the converted data to an audio memory 56. The encoded audio data is transmitted from the audio memory 56 to the receiving terminal. The audio data corresponding to the deleted frame is not deleted, and meta information of the audio data is not deleted but transmitted. This is because, when the mobile terminal 35 reproduces streaming data, the number of frames changes back into the number before frame deletion.

FIG. 6 illustrates a flowchart of a process of decreasing frames.

First, a transmitting terminal reads video data to be transmitted (S61). The transmitting terminal checks a result of delivery quality monitoring performed by the server 31 and recognizes a frame rate for transmission (S62). The transmitting terminal recognizes, from the frame rate for transmission, the number of frames to be deleted (S63). The transmitting terminal checks whether a frame to be deleted is present (S64). When a frame to be deleted is not present (No in S64), the transmitting terminal increases a buffer period (S65) and checks again whether a frame to be deleted is present (S64). When a frame to be deleted is present (S64), the transmitting terminal deletes a corresponding frame and stores information on the deleted frame in meta information (S66). The transmitting terminal again encodes and then delivers the video data (S67).

In S63, a data transmission size without timeless is checked. Assume that twenty four original frames are present and that only seventeen of these frames can be delivered without timeless. In this case, seven frames need to be deleted. For this situation, further assume that a transmission host and a reception host can secure, as a standard video buffer, a buffer for moving image data corresponding to three seconds. Deleting seven frames from twenty four frames decreases the reproduction quality after compression decoding, and accordingly compression delivery is performed after deleting 7×3=21 frames from 24×3=72 frames.

Figure 7:
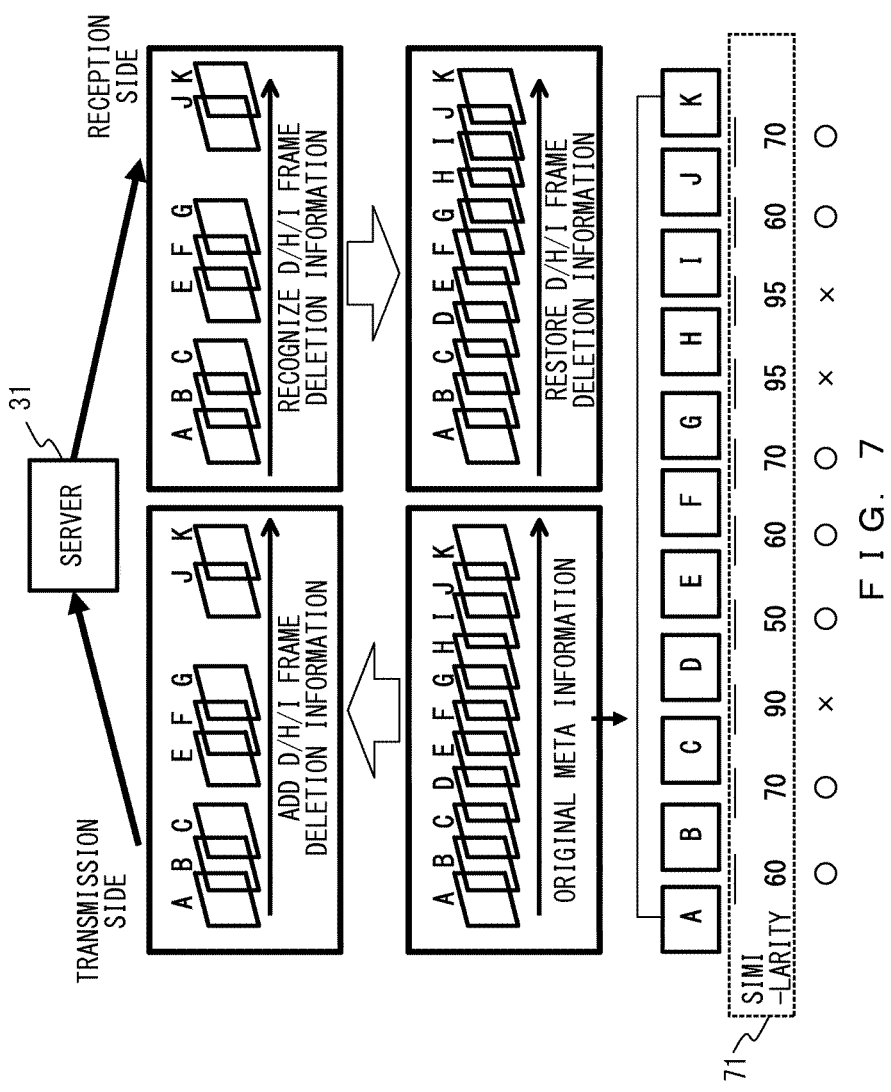
FIG. 7 illustrates a method of deleting frames.

FIG. 7 illustrates a method of deleting frames. Frames are deleted in accordance with a similarity between chronologically successive frames of moving image data.

Assume that frames A-K are transmitted from a transmitting terminal to a receiving terminal. Frames A-K are stored in a work buffer of the transmitting terminal. The work buffer does not need to store all of the frames of moving image data, and only needs to include a region that is capable of performing a process of deleting frames so as to make the frame rate equal to or lower than a frame rate determined through delivery quality monitoring. For each frame, the transmitting terminal calculates a similarity relative to a frame immediately preceding the frame (frame A is a frame immediately preceding frame B). Various techniques may be used to calculate the similarity. For example, the similarity may be a similitude rate determined through a video image frame comparison with an immediately preceding frame, or may be a value calculated using SSD (Sum of Squared Differences) of a difference between pixel values. The similarity is calculated by the transmitting terminal. As depicted by similarity 71 in FIG. 7, the similarity of B relative to A is "60", the similarity of C relative to B is "70", and the similarity of S relative to C is "90". For E-K, see similarity 71.

The transmitting terminal deletes a frame whose similarity relative to an immediately preceding frame is equal to or greater than a predetermined threshold. In the example of FIG. 7, the threshold is 90, and frames D, H, and I, i.e., frames with a similarity of 90 or greater relative to an immediately preceding frame, are deleted. As frame I indicates in the example of FIG. 7, as long as a frame has a similarity that is equal to or greater than the threshold relative to an immediately preceding frame, this frame is deleted even when the immediately preceding frame is also a frame to be deleted (frame H). That is, frames to be deleted may be successive frames, as indicated by frames H and I. When frames D, H, and I are deleted, information on the deleted frames D, H, and I is added, in a transmitting process, to meta information accompanying frames.

In some cases, a frame having a similarity that is equal to or greater than the predetermined threshold is not present within a predetermined period. As a result of performing the frame deleting process, the frame rate of moving images needs to be equal to or greater than a frame rate determined through delivery quality monitoring. Details of operations for such a situation will be described hereinafter.

In association with the frames, the transmitting terminal uploads, into the server 31, the meta information to which information on deleted frames has been added. The uploaded data is downloaded to a mobile terminal 35 that is a receiving terminal. The mobile terminal 35 receives video image data with frames D, H, and I deleted. The mobile terminal 35 receives the meta information simultaneously with the video image data and recognizes deletion information of frames D, H, and I within the meta information. In particular, the mobile terminal 35 specifies the deleted frames according to the deleted frame start number 141, deleted frame period (the number of frames) 142, and time stamp 143 of the mete information. The mobile terminal 35 performs a process of restoring moving image data by generating and inserting complementary frames for the deleted frames D, H, and I into positions of the deleted frames of the moving image data.

A complementary frame generating process is performed by leveling change points between frames preceding and following a deleted frame. That is, in the complementary frame generating process for frame D, change points between frames C and E are leveled to generate a complementary frame. In particular, first, pixel values of pixels located at corresponding positions within frames C and H are compared with each other to determine whether the pixel values are different. The pixel values are expressed by, for example, various color spaces such as an RGB color system, an XYZ color system, an xyY color system, an L*a*b* color system, and an L*u*v*color system. When the pixel values are different, the average of the two pixel values is defined as the pixel value of a pixel located at a corresponding position within the generated complementary frame. When the pixel values are not different, the pixel value of a pixel located at a corresponding position is the same as the corresponding values of the preceding and following frames.

When consecutive frames are deleted, the complementary frame generating process is performed by leveling change points between =deleted frames preceding and following the deleted frames. In this case, since the deleted frames H and I are consecutive frames, complementary frames H and I corresponding to frames H and I form equal images. This is because the complementary frames H and I are restored by leveling change points between frames G and J. In this case, the resolution of the mobile terminal 35 is low, and the number of frames is complemented to secure the apparent number of frames. Hence, video images are restored without decreasing the image quality even at a position at which a large change is made.

When consecutive frames are deleted, complementary frames may be generated by setting change points between undeleted frames preceding and following the deleted frames to values that depend on the time stamps of the deleted frames. An undeleted frame immediately preceding (immediately succeeding) a deleted frame will be referred to as a preceding (succeeding) frame. In one possible example, the amount of change per unit time in pixel values of change points between preceding and succeeding frames is determined, and the amount of change multiplied by a time between a start time of the preceding frame and a start time of a deleted frame is added to the pixel value of the preceding frame, thereby determining the pixel value of a complementary frame.

When a complementary frame corresponding to a deleted frame is generated, the mobile terminal 35 inserts the complementary frame into the position of the corresponding deleted frame. In particular, the mobile terminal 35 inserts the complementary frame into the position of the deleted frame specified according to the deleted frame start number 141, deleted frame period (the number of frames) 142, and time stamp 143 of corresponding meta information.

The following will describe operations performed in a situation in which a small number of frames have a similarity that is equal to or greater than a threshold within a predetermined period and in which the frame rate after frame deletion does not satisfy a frame rate determined through delivery quality monitoring. To address such a situation, the transmitting terminal increases a work buffer to be used for a frame deletion task. Frames are deleted in a manner such that the frame rate of moving image data for the period of frames that the work buffer can store becomes equal to or less than the frame rate determined through delivery quality monitoring.

In particular, when frames A-K do not include at least a predetermined number of frames whose similarity is equal to or greater than the threshold, frames L-V are further buffered in the work buffer, where a frame whose similarity is equal to or greater than the threshold is deleted. Then, it is checked whether the frame rate within the period of frames A-V is equal to or less than the frame rate determined through delivery quality monitoring.

FIG. 8 illustrates an operation flowchart of the deleting of frames performed by a transmitting terminal. In FIG. 8, for the sake of description, n indicates the frame number of a frame that is a target of a deleting process.

A transmitting terminal recognizes the number of frames to be deleted that is indicated after delivery quality monitoring is performed (S81). The transmitting terminal buffers a frame with frame number n−1 (S82). Then, the transmitting terminal buffers a frame with frame number n (S83). The transmitting terminal calculates a similarity between the frame with frame number n−1 and the frame with frame number n (S84), and determines whether the similarity is equal to or greater than a predetermined threshold (in this example, 90%) (S85). When the similarity is less than the predetermined threshold (No in S85), n is incremented, and the flow shifts to step S82. When it is determined in S85 that the similarity is equal to or greater than the predetermined threshold (Yes in S85), the frame with frame number n is deleted, and information on the deleted frame is added to meta information (S86). Then, n is incremented, and the flow shifts to step S82. The flow ends when all of the frames are buffered.

Figure 9:
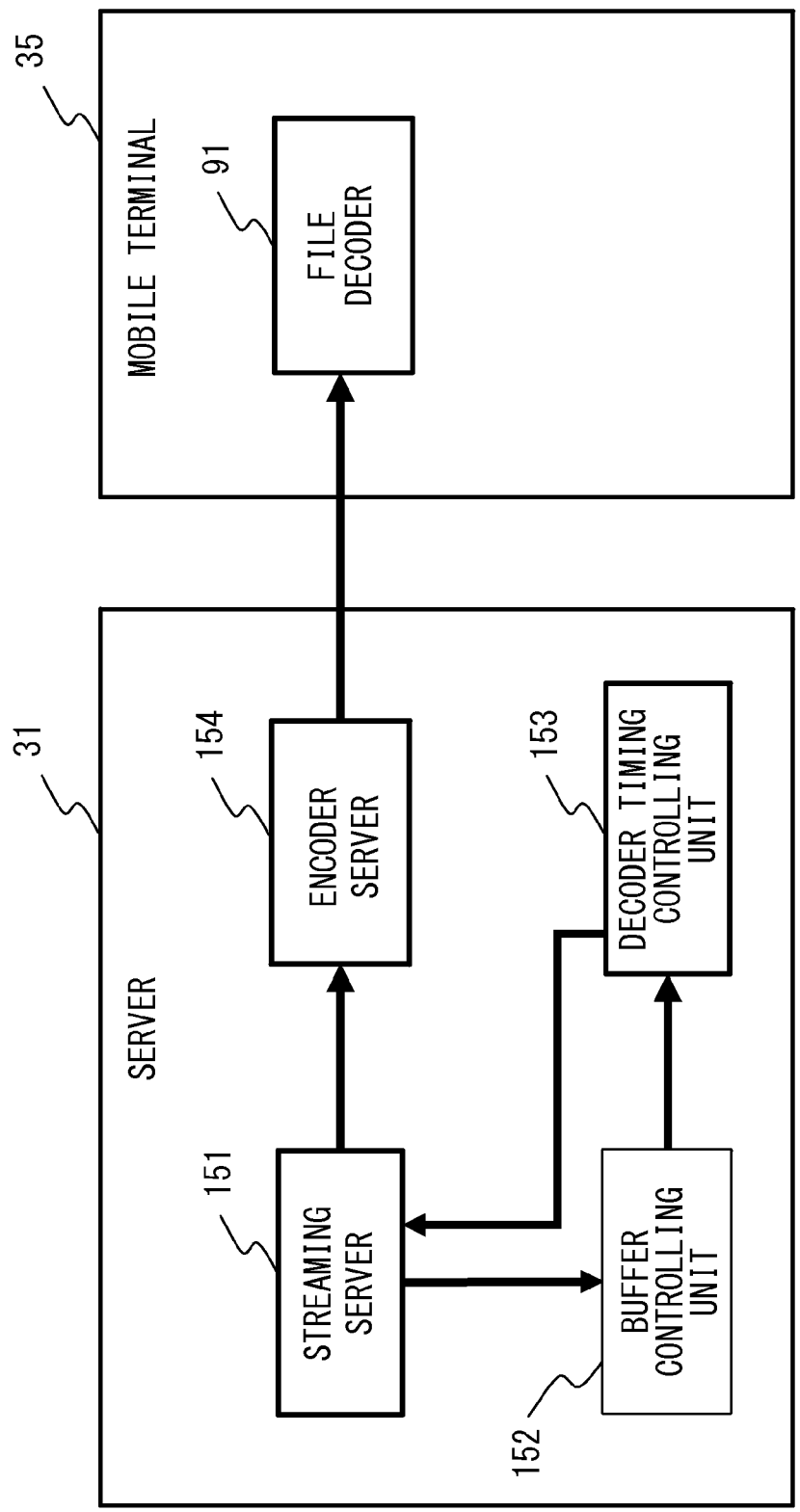
FIG. 9 illustrates a deleting process operation performed when a frame to be deleted is not found.

FIG. 9 illustrates a deleting process operation performed when a frame to be deleted is not found. In FIG. 9, a certain number of frames are deleted from original frames at a certain rate, and accordingly a transmitting terminal has a buffer function for accumulating video images for a certain time period to address streaming delivery.

A streaming server 151 within a moving image server 31 stores moving image data to be delivered. The moving image server 31 may perform bandwidth monitoring to check the amount of data that can be delivered during a certain period.

When a frame to be deleted is not present during a certain period of moving images, a buffer controlling unit 152 finds a deletable frame by buffering succeeding frames. When the transmission rate of video data becomes less than the bandwidth as a result of deleting the frame, a decoder timing controlling unit 153 starts delivering the moving image data from which the frame has been deleted. In this case, an encoder server 154 encodes and delivers, to a mobile terminal 35, the video data from which the frame has been deleted. Note that a transmitting process may be performed by encoding nieces of data from a video memory and an audio memory as one piece of data. A file decoder 91 of the mobile terminal 35 receives an encoded moving image from the server 31.

The frame deleting process performed in the embodiment is different from compression methods used in MPEG2 and so on. In the frame deleting process of the embodiment, a frame with a small amount of change relative to preceding and succeeding frames is deleted, thereby significantly decreasing the amount of information in comparison with a compression method such as MPEG2.

Figure 10:
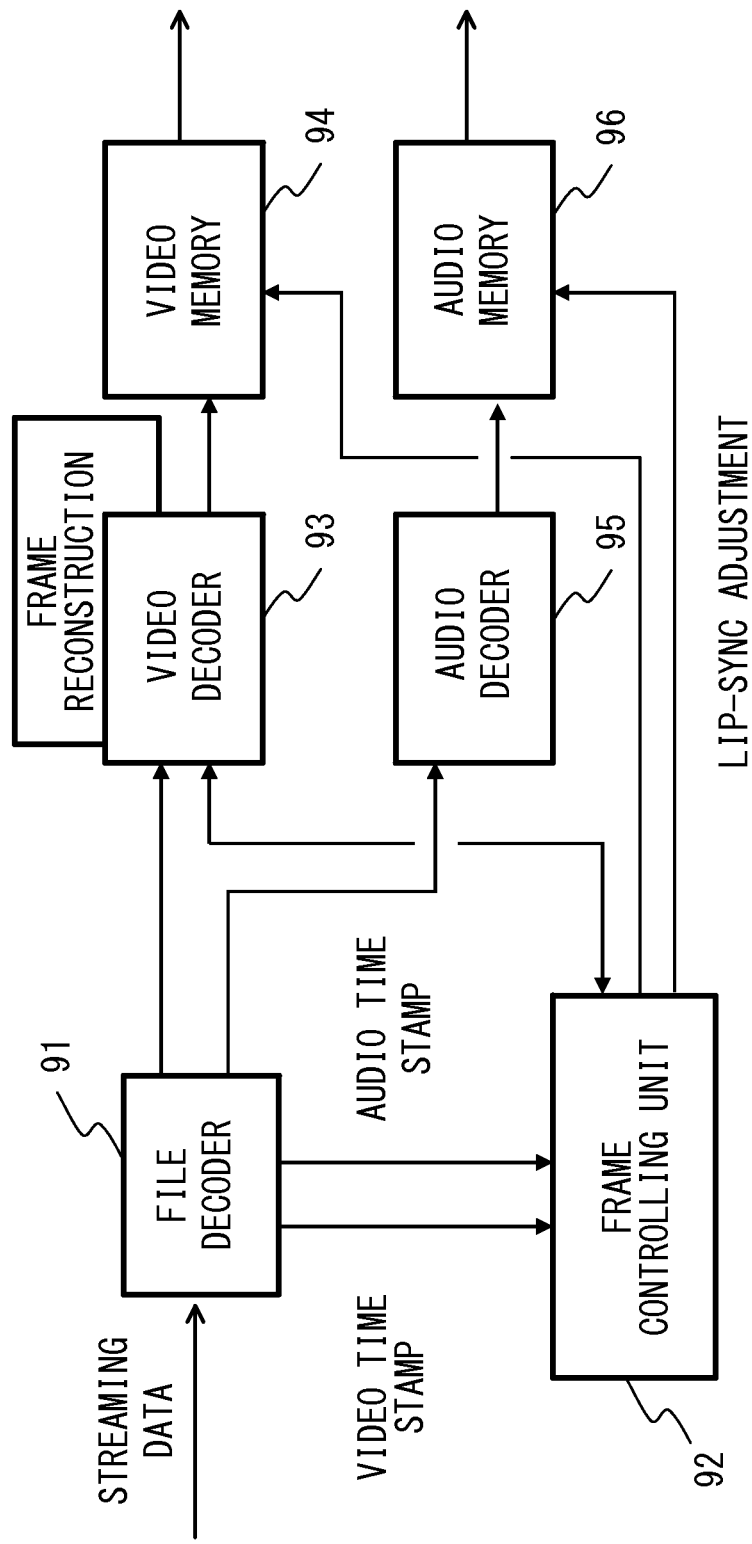
FIG. 10 illustrates a decoding process performed by a receiving terminal.

FIG. 10 illustrates a decoding process performed by a receiving terminal. A decoding process unit includes a file decoder 91, a frame controlling unit 92, a video decoder 93, a video memory 94, an audio decoder 95, and an audio memory 96.

The file decoder 91 separates streaming data received from a transmitting terminal into video data and audio data. The file decoder 91 outputs the video data to the video decoder 93 and outputs the audio data to the audio decoder 95. The file decoder 91 also extracts meta information from the received streaming data and transmits the meta information to the frame controlling unit 92.

The frame controlling unit 92 recognizes a deleted frame from the meta information received from the file decoder 91 and outputs information on the deleted frame to the video decoder 93. The information on the deleted frame includes, for example, a deleted frame start number 141, a deleted frame period (the number of frames) 142, and a time stamp 143 of the deleted frame. The frame controlling unit 92 also receives a time stamp of the audio data and a time stamp of the video data. The frame controlling unit 92 makes a lip-sync adjustment in accordance with reconstruction of the deleted frame.

The video decoder 93 receives video data from the file decoder 91 and receives deleted frame information from the frame controlling unit 92. The video decoder 93 decodes the video data. The video decoder 93 reconstructs the frame by generating a complementary frame for the deleted frame from the video data and the deleted frame information. The video decoder 93 outputs the reconstructed video data to the video memory 94.

The audio decoder 95 receives audio data from the file decoder 91 and performs a decoding process. Then, the audio decoder 95 outputs the audio data to an audio memory 96.

Figure 11:
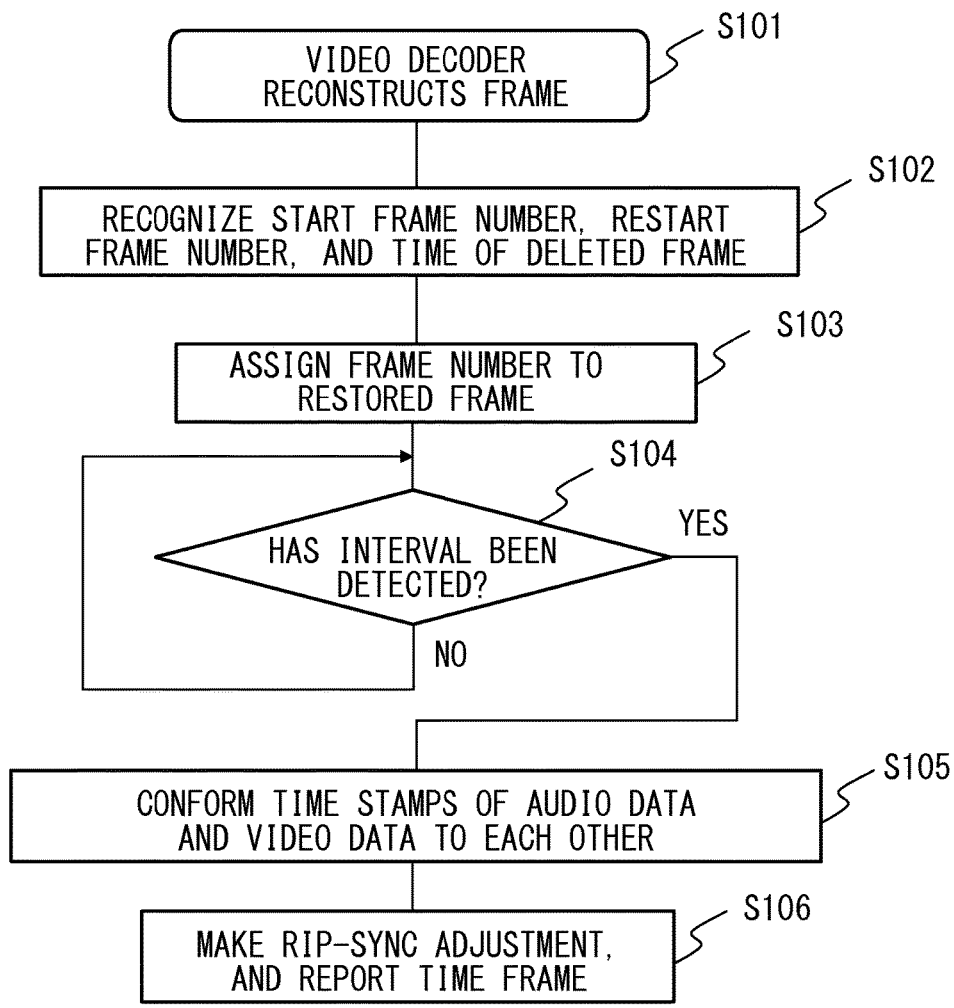
FIG. 11 is a flowchart of the reconstructing of a frame performed by a receiving terminal.

The following will describe operations of the reconstructing of a frame performed by a receiving terminal. FIG. 11 is a flowchart of the reconstructing of a frame performed by a receiving terminal.

The video decoder 95 performs a process of generating a complementary frame for a deleted frame (S101). The video decoder 95 receives information on the deleted frame from the frame controlling unit 92. The information on the deleted frame includes, for example, a deleted frame start number 141, a deleted frame period (the number of frames) 142, and a time stamp 143. The video decoder 95 recognizes, from the information on the deleted frame, the deleted frame number or restart frame number and the time of that frame (S102).

The video decoder 95 assigns a frame number to the generated complementary frame according to the recognized deleted frame number or restart frame number (S103).

When the video decoder 95 detects frames for a predetermined interval (S104), i.e., when the video decoder 95 detects frames for a predetermined period, the video decoder 95 conforms the time stamps of frames of audio data and the time stamps of frames of video data to each other using meta information (S105). This adjusts lip-sync and thus synchronizes moving images and sounds with each other. Then, the video decoder 95 reports restored frames and sound data on which the lip-sync process has been completed to a moving image reproduction application (S106). Using these pieces of data, the mobile terminal 35 reproduces video images.

The following will describe lip-sync. Lip-sync is a mismatch between a sound and image of a moving image. In a lip-synch adjustment, sound frames and video image frames are adjusted in a manner such that a viewer can hear a displayed person talking without a feeling of strangeness. In the embodiment, a transmitting terminal deletes a video frame, and accordingly a mobile terminal 35 makes an adjustment according to original time stamp information in a manner such that the time stamp of a video frame added by a receiving terminal is consistent with the time stamp of an audio frame corresponding to the video frame. Hence, in meta information changing performed together with frame deletion performed by the transmitting terminal, the time stamp of the audio frame does not change. Consequently, some audio frames correspond to none of the video frames. Accordingly, meta information changed by a transmitting apparatus is information on a video frame.

FIG. 12 illustrates an operation flowchart of a process of restoring moving image data performed by a receiving terminal. In FIG. 12, for the sake of description, n+1 indicates the frame number of a frame that is a target of a restoring process.

A receiving terminal checks the presence/absence of a deleted frame according to meta data (S111). That is, the receiving terminal recognizes a deleted frame start number 141, deleted frame period (the number of frames) 142, and time stamp 143 of a deleted frame included in the meta data. The receiving terminal buffers a frame (n frame) having a frame number immediately preceding the deleted frame start number 141 (S112). The receiving terminal buffers a frame (n+2 frame) having a frame number immediately succeeding the deleted frame start number 141 (S113). The receiving terminal generates a complementary frame (n+1 frame) for the deleted frame by leveling change points between n frame and n+2 frame, and assigns a deleted frame start number 141 and a time stamp 143 to the complementary frame (S114). The receiving terminal outputs n frame (S115) and then outputs n+1 frame (S116).

Figure 13:
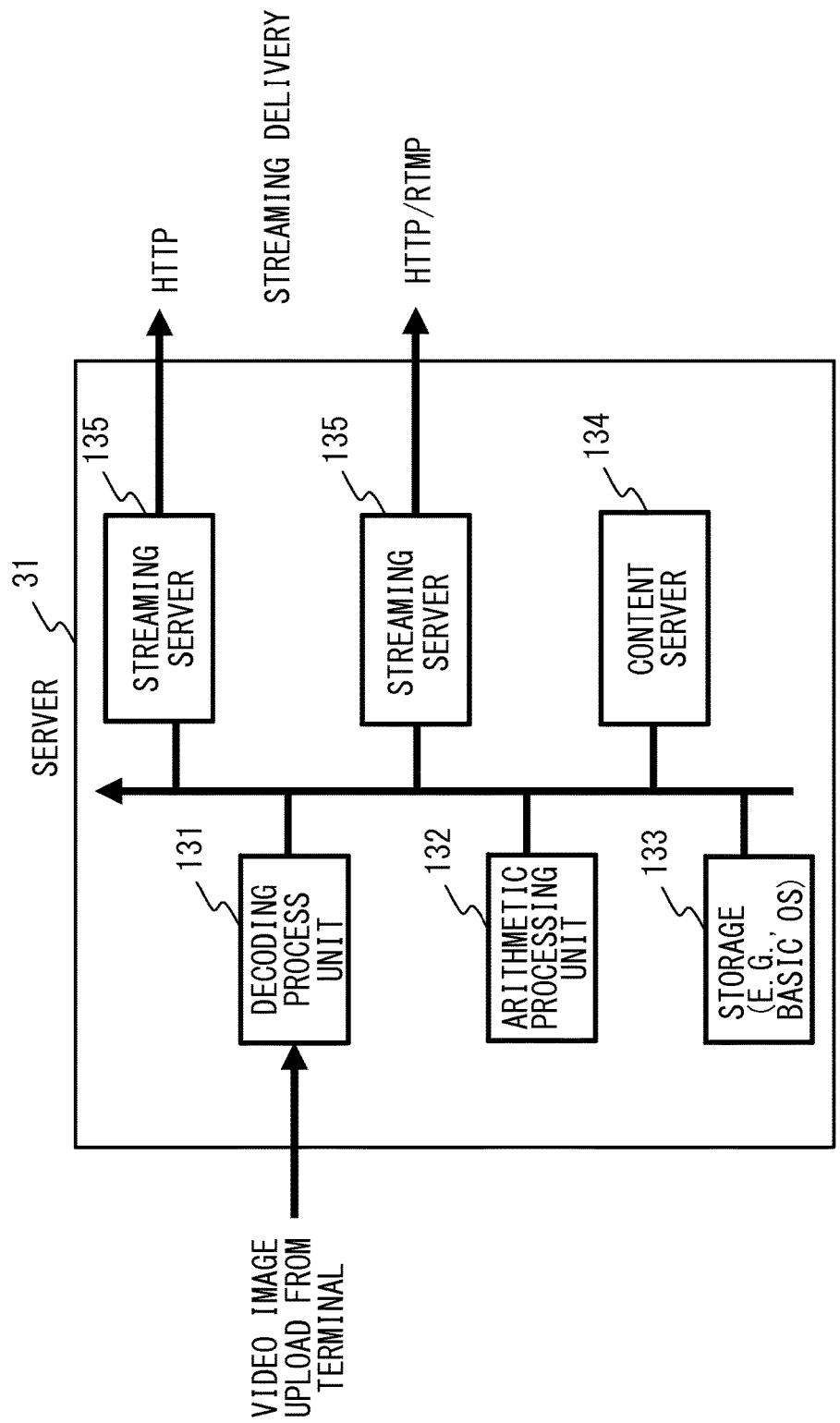
FIG. 13 illustrates an exemplary configuration of a moving image server in accordance with the embodiment.

FIG. 13 illustrates an exemplary configuration of the server 31 in accordance with the embodiment. The server 31 includes a decoding process unit 131, an arithmetic processing unit 132, a storage 133, a content server 134, and a streaming server 135.

The decoding process unit 131 decodes moving image data uploaded from a terminal device such as the PC 33. A piece of uploaded moving image data has been divided into pieces in a format for transmission, pieces of uploaded moving image data have been integrated into a piece in a format for transmission, or uploaded moving image data has been compressed. Accordingly, a decoding process is performed to restore moving image data.

The arithmetic processing unit 132 monitors the bandwidth and manages delivery qualities, and, in accordance with a result of the monitoring or managing, performs a process of deleting a frame of moving image data and a process of changing meta information.

The storage 133 has stored therein an operating system, middleware, and application to be loaded into a memory by the arithmetic processing unit 132.

The content server 134 manages contents prepared for streaming reproduction. The mobile terminal 35 may select moving images to be reproduced from the contents managed by the content server 134.

A streaming server 135 delivers moving image data to the mobile terminal 35. After a frame is deleted from the moving image data, the moving image data is received from the arithmetic processing unit 132. The streaming server 135 is divided in accordance with a protocol to be used for delivery, e.g., HTTP (HyperText Transfer Protocol) or HTTP/RTMP.

Figure 14:
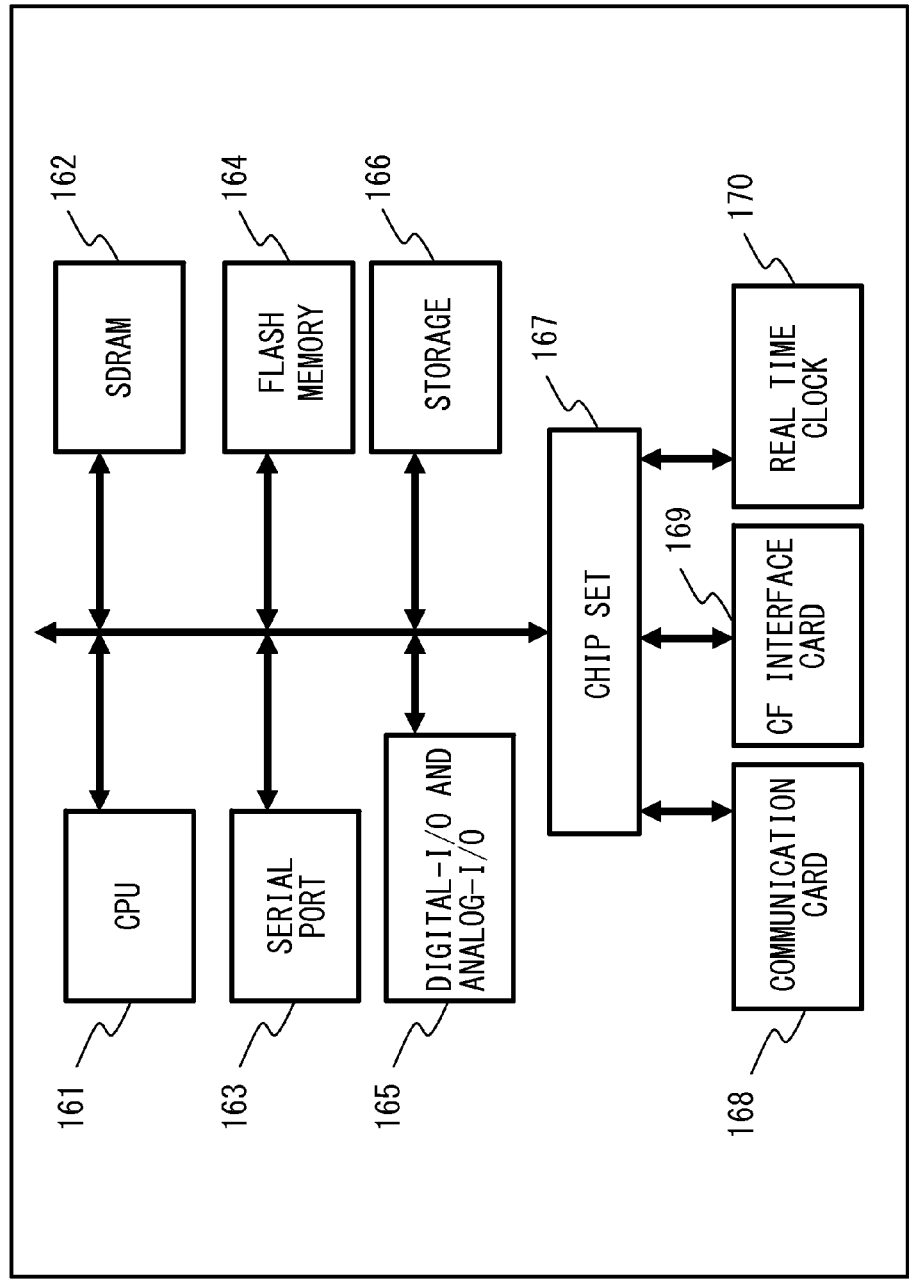
FIG. 14 illustrates an exemplary hardware configuration of a server or PC in accordance with the embodiment.

FIG. 14 illustrates an exemplary hardware configuration of a server 31 or PC 33 in accordance with the embodiment. The server 31 or the PC 33 includes a CPU (Central Processing Unit) 161, an SDRAM (Synchronous Dynamic Random Access Memory) 162, a serial port 163, a flash memory 164, and a digital-I/O and analog-I/O 165. The server 31 or the PC 33 also includes a storage 166, a chip set 167, a communication card 168, a CF (Compact Flash (registered trademark)) interface card 169, and a real-time clock 170.

Using the SDRAM 162 or the flash memory 164, the CPU 161 executes a program saved in the storage 166 and describing the procedures of the flow diagrams described above. The CPU 161 exchanges data with the communication card 168, the CF interface card 169, and the real-time clock 170 via the chip set 167. The server 31 or the PC 33 transmits moving image data to and receives moving image data from the serial port 163 or digital-I/O and analog-I/O 165 via a communication card. The CPU 161 provides some of or all of the functions of the monitoring unit 3, the deleting unit 4, the frame information generating unit 5, the transmitting unit 6, the receiving unit 8, the complementary image generating unit 9, and the moving image data generating unit 10. The CPU 161 encodes or decodes moving image data, makes a lip-sync adjustment, performs an authentication operation for establishing a connection, and reproduces moving image data. The storage 166 provides some of or all of the functions of the storage unit 2. The CPU 161 may use the SDRAM 162 as a temporary data saving region (work buffer) for performing a process of deleting a frame of moving image data and a process of restoring moving image data. The SDRAM 162 is not limited to this, and various RAMs (Random Access Memories) may be used as the SDRAM 162.

The flash memory 164 saves, for example, a kernel, an application in the server 31, and a configuration file. The flash memory includes an extended region that can be used as a temporary data saving region (work buffer) for performing a process deleting a frame of moving image data and a process of restoring moving image data.

The CF (Compact Flash(registered trademark)) interface card 169 is used as an auxiliary function to be used for, for example, maintenance of the server 31. The CF interface card 169 has a storage mounted therein. Accordingly, the storage is often used for data processing between the PC and mobile terminals 35.

The real-time clock 170 is a dedicated chip having a function that serves as a clock for a computer. The time stamp of a frame is set in accordance with the clock of the real-time clock 170.

The first information processing apparatus 1 and the second information processing apparatus 7 in accordance with the embodiment may partly be achieved by hardware. Alternatively, the information processing apparatus 1 and the second information processing apparatus 7 in accordance with the embodiment may be achieved by a combination of software and hardware.

Figure 15:
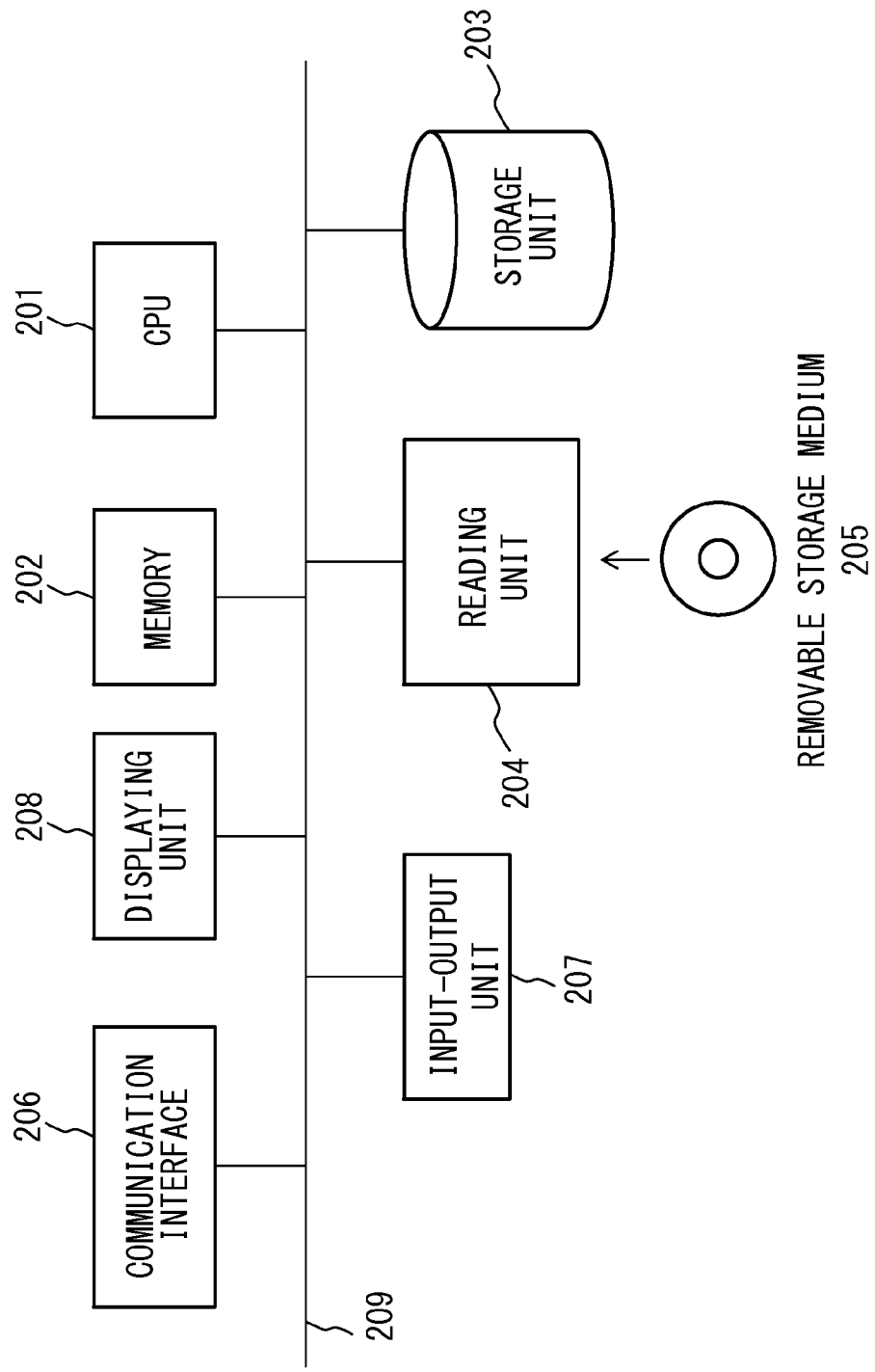
FIG. 15 illustrates an exemplary hardware configuration of a mobile, terminal in accordance with the embodiment.

FIG. 15 illustrates an exemplary hardware configuration of the mobile terminal 35 in accordance with the embodiment. As depicted in FIG. 15, the mobile terminal 35 includes a CPU 201, a memory 202, a storage unit 203, a reading unit 204, a communication interface 206, an input-output unit 207, and a displaying unit 208. The CPU 201, the memory 202, the storage unit 203, the reading unit 204, the communication interface 206, the input-output unit 207, and the displaying unit 208 are connected to each other by, for example, a bus 209.

Using the memory 202, the CPU 201 executes a program describing the procedures of the flowcharts described above. The CPU 201 provides some of or all of the functions of the receiving unit 8, the complementary image generating unit 9, and the moving image data generating unit 10. The CPU 201 decodes moving image data, makes a lip-sync adjustment, and reproduces moving image data. The memory 202 is, for example, a semiconductor memory and includes a RAM region and a ROM region The storage unit 203 is, for example, a hard disk. The storage unit 203 may be a semiconductor memory such as a flash memory. An application for reproducing moving image data is stored in the memory 202 or the storage unit 203 and is executed by the CPU 201. In one possible configuration, the mobile terminal 35 does not include the storage unit 203.

In accordance with an instruction from the CPU 201, the reading unit 204 accesses a removable storage medium 205. The removable storage medium 205 is achieved by, for example, a semiconductor device (e.g., USB memory), a medium to which information is input and from which information is output through a magnetic effect (e.g., magnetic disk), or a medium to which information is input and from which information is output through an optical effect (e.g., CD-ROM or DVD).

The communication interface 206 transmits or receives data over a network in accordance with an instruction from the CPU 201. The communication interface 206 receives moving image data. The input-output unit 207 corresponds to, for example, a device that receives an instruction from a user. The user can use the input-output unit 207 to designate moving image data to be reproduced or the resolution of moving image data. The displaying unit 208 displays reproduced moving image data.

An information processing program for achieving the embodiment is provided to the mobile terminal 35 in, for example, any of the following manners.
(1) Installed in the storage unit 203 in advance
(2) Provided by the removable storage medium 205
(3) Provided over a network
<Variation>

Figure 16:
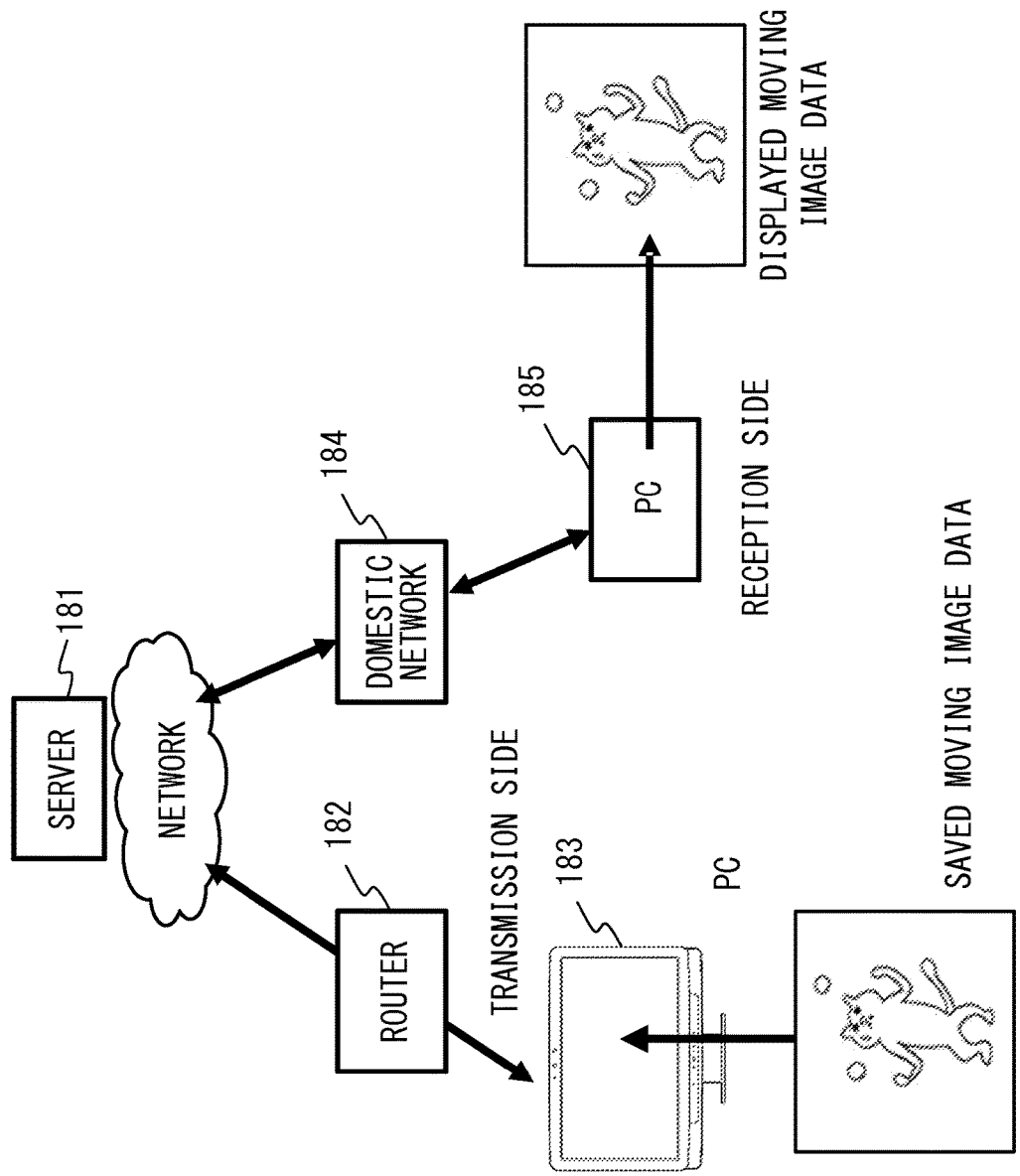
FIG. 16 illustrates an exemplary configuration of an information processing system in accordance with the embodiment (variation).

FIG. 16 illustrates an exemplary configuration of an information processing system in accordance with the embodiment (variation). The variation is different from the other embodiments in the sense that a receiving terminal is a terminal device, e.g., the PC 33. Depending on an Internet bandwidth, deterioration of image quality could be recognized even between the same types of PCs 33. In such a situation, the present invention is applied.

In the embodiments and the variation, soundless moving image data may be delivered. In this case, since the data does not include sound, a lip-sync adjustment does not need to be performed.

Processing performed by the PC 33 of the embodiment and processing corresponding thereto may be performed by the server 31. In this case, the PC 33 includes a storage unit that stores moving image data. Accordingly, processing to be performed in a communication between the PC 33 and server 31 of the embodiment may be omitted. The mobile terminal 35 may be a thin client terminal. Decoding in accordance with the embodiment may be performed in conformity with a standard such MPEG2.

In the embodiments, moving images are delivered in a streaming format from the PC 33 to the mobile terminal 35, but the delivery method is not limited to a streaming format.

An information processing system in accordance with an embodiment is capable of improving a reproduction quality for moving image data transmitted from a storage over a network.

Embodiments are not limited to those described above. Various configurations or embodiments may be used without departing from the gist of the embodiments described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a storage unit that stores first moving image data; and
    a processor that performs processes including:
        monitoring a state of a communication network, the state including a bandwidth of the communication network;
        obtaining a resolution of a display of moving image data;
        generating second moving image data by adjusting a resolution of the first moving image data to the obtained resolution of the display in addition to deletion of a frame whose similarity to another frame is equal to or greater than a predetermined threshold, from among consecutive frames of the first moving image data, in accordance with a result of the monitoring so as to make a transmission rate of the second moving image data equal or lower than a predetermined value adapted to the bandwidth of the communication network;
        generating frame information indicating a position of the deleted frame of the second moving image data; and
        transmitting the second moving image data and the frame information, wherein
    when the transmission rate during a first period does not become equal or lower than the predetermined value after adjusting the resolution of the first moving image in addition to deletion all of frames whose similarity to another frame is equal or greater than the predetermined threshold from among consecutive frames of the first moving image data within the first period, the generating the second moving image data generates the second moving image by deleting frames whose similarity to another frame is equal or greater than the predetermined threshold, from among consecutive frames of the first moving image data within a second period which is longer than the first period, so as to make the transmission rate during the second period equal or lower than the predetermined value.

2. The information processing apparatus according to claim 1, wherein
    the generating frame information adds the frame information to meta information related to the second moving image data, and
    the transmitting transmits the second moving image data and the meta information.

3. The information processing apparatus according to claim 1, wherein
    the frame information includes a start number of the deleted frame and a period of the deleted frame.

4. An information processing apparatus comprising:
    a processor that performs processes including:
        receiving second moving image data and frame information, the second moving image data being generated by adjusting a resolution of first moving image data to a resolution of a display of moving image data in addition to deletion of a frame whose similarity to another frame is equal to or greater than a predetermined threshold, from among consecutive frames of the first moving image data, in accordance with a result of monitoring a state of a communication network so as to make a transmission rate of the second moving image data equal or lower than a predetermined value adapted to a bandwidth of the communication network, the second moving image data being generated, when the transmission rate during a first period does not become equal or lower than the predetermined value after adjusting the resolution of the first moving image in addition to deletion all of frames whose similarity to another frame is equal or greater than the predetermined threshold from among consecutive frames of the first moving image data within the first period, by deleting frames whose similarity to another frame is equal or greater than the predetermined threshold, from among consecutive frames of the first moving image data within a second period which is longer than the first period, so as to make the transmission rate during the second period equal or lower than the predetermined value, the state including the bandwidth of the network, the frame information indicating a position of the deleted frame of the second moving image data;

generating a complementary image for complementing an image of the deleted frame by using the frame information; and generating moving image data by inserting the complementary image at the position indicated by the frame information.

5. The information processing apparatus according to claim 4, wherein
the generating a complementary image generates the complementary image according to change points between frames preceding and following the deleted frame.

6. A non-transitory computer-readable recording medium having stored therein a program for causing a computer to execute a process comprising:

monitoring a state of a communication network, the state including a bandwidth of the communication network;

generating second moving image data by adjusting a resolution of the first moving image data to the obtained resolution of the display in addition to deletion of a frame whose similarity to another frame is equal to or greater than a predetermined threshold, from among consecutive frames of a first moving image data, in accordance with a result of the monitoring so as to make a transmission rate of the second moving image data equal or lower than a predetermined value adapted to the bandwidth of the communication network;

generating frame information indicating a position of the deleted frame of the second moving image data; and transmitting the second moving image data and the frame information, wherein when the transmission rate during a first period does not become equal or lower than the predetermined value after adjusting the resolution of the first moving image in addition to deletion all of frames whose similarity to another frame is equal or greater than the predetermined threshold from among consecutive frames of the first moving image data within the first period, the generating the second moving image data generates the second moving image by deleting frames whose similarity to another frame is equal or greater than the predetermined threshold, from among consecutive frames of the first moving image data within a second period which is longer than the first period, so as to make the transmission rate during the second period equal or lower than the predetermined value.

* * * * *